United States Patent
Drozdzal et al.

(10) Patent No.: US 10,204,411 B2
(45) Date of Patent: Feb. 12, 2019

(54) SYSTEM AND METHOD FOR SEQUENTIAL IMAGE ANALYSIS OF AN IN VIVO IMAGE STREAM

(71) Applicant: GIVEN IMAGING LTD., Yoqneam (IL)

(72) Inventors: Michal Drozdzal, Wroclaw (PL); Santiago Segui-Mesquida, Barcelona (ES); Jordi Vitria, Barcelona (ES); Petia Radeva, Barcelona (ES); Carolina Malagelada, Barcelona (ES); Fernando Azpiroz, Barcelona (ES)

(73) Assignee: GIVEN IMAGING LTD., Yoqneam (IL)

( * ) Notice: Subject to any disclaimer, the term of this patent is extended or adjusted under 35 U.S.C. 154(b) by 79 days.

(21) Appl. No.: 15/309,955

(22) PCT Filed: May 4, 2015

(86) PCT No.: PCT/IL2015/050463
§ 371 (c)(1),
(2) Date: Nov. 9, 2016

(87) PCT Pub. No.: WO2015/170319
PCT Pub. Date: Nov. 12, 2015

(65) Prior Publication Data
US 2018/0182092 A1     Jun. 28, 2018

Related U.S. Application Data

(60) Provisional application No. 61/990,990, filed on May 9, 2014.

(51) Int. Cl.
*G06K 9/00*     (2006.01)
*G06T 7/00*     (2017.01)
(Continued)

(52) U.S. Cl.
CPC ........ *G06T 7/0012* (2013.01); *G06K 9/00765* (2013.01); *G06T 11/60* (2013.01); *G06K 9/4652* (2013.01); *G06T 2207/30028* (2013.01)

(58) Field of Classification Search
CPC .................. G06T 7/0012; G06T 11/60; G06T 2207/30028; G06K 9/00765
See application file for complete search history.

(56) References Cited

U.S. PATENT DOCUMENTS

| 6,944,316 B2 | 9/2005 | Glukhovsky et al. |
| 7,009,634 B2 | 3/2006 | Iddan et al. |

(Continued)

FOREIGN PATENT DOCUMENTS

| EP | 1618832 | 1/2016 |
| WO | WO 2014/002096 | 1/2014 |

OTHER PUBLICATIONS

Stanek Sean R et al: "Automatic real-time detection of endoscopic procedures using temporal features", Computer Methods and Programs in Biomedicine, vol. 108, No. 2, pp. 524-535.

(Continued)

*Primary Examiner* — Siamak Harandi
(74) *Attorney, Agent, or Firm* — Pearl Cohen Zedek Latzer Baratz LLP

(57) ABSTRACT

A system and method for segmenting an image stream to a plurality of segments is provided. A processing unit may be configured to calculate a set of pixel-based properties for frames of an image stream, and detect segments of constant mean values in the sets of pixel-based properties. The segments of constant mean values are detected by using a window method that determines possible partition points of the window, and calculating a difference between mean values of the sets of pixel-based properties for each sub-window of frames. Points of change may be identified in the calculated difference between mean values of the sets of (Continued)

pixel-based properties. A display unit may display a summarized representation of the image stream, wherein the summarized representation includes a plurality of segments, each segment corresponding to a segment of constant mean values in the sets of pixel-based properties.

20 Claims, 16 Drawing Sheets

(51) Int. Cl.
  *G06T 11/60* (2006.01)
  *G06K 9/46* (2006.01)

(56) References Cited

U.S. PATENT DOCUMENTS

| | | | |
|---|---|---|---|
| 7,215,338 | B2 | 5/2007 | Horn et al. |
| 7,474,327 | B2 | 1/2009 | Davidson et al. |
| 7,577,283 | B2 | 8/2009 | Zinaty et al. |
| 2006/0074275 | A1 | 4/2006 | Davidson et al. |
| 2006/0281987 | A1 | 12/2006 | Bartesaghi et al. |
| 2007/0118012 | A1 | 5/2007 | Gilad |
| 2010/0053313 | A1 | 3/2010 | Horn et al. |
| 2012/0057766 | A1* | 3/2012 | Drozdzal ............... A61B 1/041 382/128 |
| 2012/0139936 | A1 | 6/2012 | Horn et al. |
| 2015/0016700 | A1 | 1/2015 | Drozdzal et al. |

OTHER PUBLICATIONS

Wassily Hoeffding, "Probability Inequalities for Sums of Bounded Random Variables," Journal of the American Statistical Association, pp. 13-30, Mar. 1963.

Albert Bifet and Ricard Gavalda, "Learning from time-changing data with adaptive windowing," SIAM International Conference on Data Mining, Oct. 17, 2006.

Jean-Yves Audibert, Remi Munos, and Csaba Szepesvari, "Tuning Bandit Algorithms in Stochastic Environments," In Proceedings of the 18th international conference on Algorithmic Learning Theory, pp. 1-15, Berlin, Heidelberg, 2007.

* cited by examiner

SYSTEM AND METHOD FOR SEQUENTIAL IMAGE ANALYSIS OF AN IN VIVO IMAGE STREAM

CROSS-REFERENCE TO RELATED APPLICATIONS

This application is a National Phase Application of PCT International Application No. PCT/IL2015/050463, International Filing Date May 4, 2015, which claims priority from U.S. Provisional Patent Application No. 61/990,990, filed May 9, 2014, all of which are hereby incorporated by reference.

FIELD OF THE INVENTION

The present invention relates to a method and system for image processing of an image stream captured in-vivo. More specifically, the present invention relates to systems and methods for dividing an image stream into a plurality of segments of a gastrointestinal (GI) tract, and for presenting a summarized display of the analysis.

BACKGROUND OF THE INVENTION

In-vivo imaging methods, such as performed by an in-vivo imaging system including a swallowable capsule, may be used to image body lumens within a patient. The imaging system may capture and transmit, for example, images of the GI tract to an external recording device, while the capsule passes through the GI lumen. The capsule may capture images in variable frame rates of, for example, 1-40 frames per second. Large numbers of images, for example 100,000 to 300,000 images, may be collected for viewing during the imaging procedure, which may be performed in a duration of one to eight hours, and may be viewed and/or processed in real time. The images may be combined in sequence, and an image stream or movie of, for example, 30-120 minutes in length, may be presented to a user.

The small bowel (also called small intestine) is a part of the GI tract, connecting the stomach with the large intestine. The length of the small intestine in an adult is variable, and depending on the conditions can measure from 3 to 8 meters. The main function of the small bowel is the digestion and absorption of nutrients and minerals found in the food. In order to do so, the small intestine pushes the food through by the means of a physiological mechanism called motility.

Intestinal motility can be divided into two categories: peristalsis, e.g. synchronized movement of the intestinal wall responsible for moving the food in one direction; and independent contractions, e.g. unsynchronized movement of the intestinal wall where the muscles squeeze substantially independently of each other, which may have the effect of mixing the contents but not moving them up or down.

Image analysis may be performed, for example in order to reduce a physician's viewing time of the captured image stream, or to improve the efficiency of review. A summarized presentation of the image analysis may be displayed using a graphical user interface. For example, U.S. Pat. No. 7,215,338, incorporated herein by reference in its entirety, discloses in some embodiments methods of generating and displaying a summarized color bar presentation, which includes a series of summaries of color data of one or more images from a data stream. US Published Patent Application 2015-0016700, incorporated herein by reference in its entirety, discloses in some embodiments a system and method for displaying motility events of a patient's GI tract for improving intestinal motility analysis and assisting diagnosis of intestinal motility disorders, by selecting a strip of pixels from each image and arranging the strips to form a motility events bar.

SUMMARY OF THE INVENTION

A computer-implemented method is presented, for partitioning an image stream into a plurality of segments. An embodiment of the method may include receiving an image stream of frames captured by the in vivo device, each frame comprising a plurality of pixels. A set of pixel-based properties may be calculated for each frame of at least a selected subset of frames from the image stream. Segments of constant mean values may be detected in the sets of pixel-based properties, for example by selecting a set or window of sequential frames in the image stream, determining possible partition points of the window, each partition point splitting the window of sequential frames into two sub-windows of sequential frames, calculating, for possible partition points of the window, difference between mean values of the sets of pixel-based properties for each sub-window of frames, and identifying points of change in the calculated difference between mean values of the sets of pixel-based properties.

A difference measure, which correlates to the calculated difference between mean values, may be computed, in order to identify points of change. For example, a value p may be selected for calculating a p-norm value of the difference between the mean values of the set of pixel-based properties for each sub-window of frames for possible partition points according to the selected value p. The calculated difference or difference measure may be compared to a segmentation threshold. The segmentation threshold may be preset, or calculated based on, for example, a confidence value $\delta$, a value p, and the size of the window of frames. Confidence value $\delta$ is correlated to the probability that a point of change is incorrectly detected in the calculated difference between mean values of the sets of pixel-based properties.

In some embodiments, at least a subset of properties in the set of pixel-based properties indicate a mean color of the image frame, and colors in the color bar are assigned based on the mean color of the corresponding detected segment. In some embodiments, at least one property in the set of pixel-based properties indicates a level of intestinal content depicted in the image frame, and a predetermined value in the summarized representation of the image stream indicates a segment of the image stream which includes image frames with an above-threshold level of intestinal content. In some embodiments, at least one property in the set of pixel-based properties indicates a size of an intestinal lumen hole detected in the image frame. In some embodiments, at least one property in the set of pixel-based properties indicates a contraction density detected in the image frame.

A summarized representation of the image stream may be displayed on a visual display unit, e.g., a monitor or graphical display. The summarized representation may include, for example, a plurality of segments, each segment corresponding to a segment of constant mean values in the sets of pixel-based properties. The summarized representation of the image stream may include color values assigned to each of the detected segments, which may be displayed sequentially in a color bar.

A computer-implemented method for segmenting an image stream to a plurality of segments is provided according to embodiments of the present invention. An image stream comprising image frames captured by the in vivo device may be received, each frame comprising a plurality of pixels. Based on the frame pixels, a feature vector may be calculated for at least a selected subset of frames from the image stream. Possible splits of at least a portion of the image stream into two sequential series of frames may be determined, and mean values of the feature vectors may be calculated for each sequential series of frames of a possible split. Difference measures may be calculated based on differences between the mean values of the feature vectors in each sequential series of frames of a possible split, to identify points of change in the mean values. The image stream may then be segmented according to the identified points of change.

A system for segmenting an image stream to a plurality of segments may include a processing unit configured to receive image frames captured by an in vivo imaging device, each frame comprising a plurality of pixels, calculate a set of pixel-based properties for each frame of at least a selected subset of frames from the image stream, and detect segments of constant mean values in the sets of pixel-based properties. The segments may be detected by selecting a window of sequential frames in the received image frames, determining possible partition points of the window, each partition point splitting the window of sequential frames into two sub-windows of sequential frames, calculating, for possible partition points of the window, difference between mean values of the sets of pixel-based properties for each sub-window of frames, and identifying points of change in the calculated difference between mean values of the sets of pixel-based properties.

In some embodiments, identifying points of change in the calculated difference between mean values may include comparing the calculated difference to a segmentation threshold. The processing unit may also be configured to determine a confidence value δ, wherein confidence value δ is correlated to the probability that a point of change is incorrectly detected.

BRIEF DESCRIPTION OF THE DRAWINGS

The principles and operation of the system and method according to the present invention may be better understood with reference to the drawings, and the following description, it being understood that these drawings are given for illustrative purposes only and are not meant to be limiting, wherein.

Figure 1:
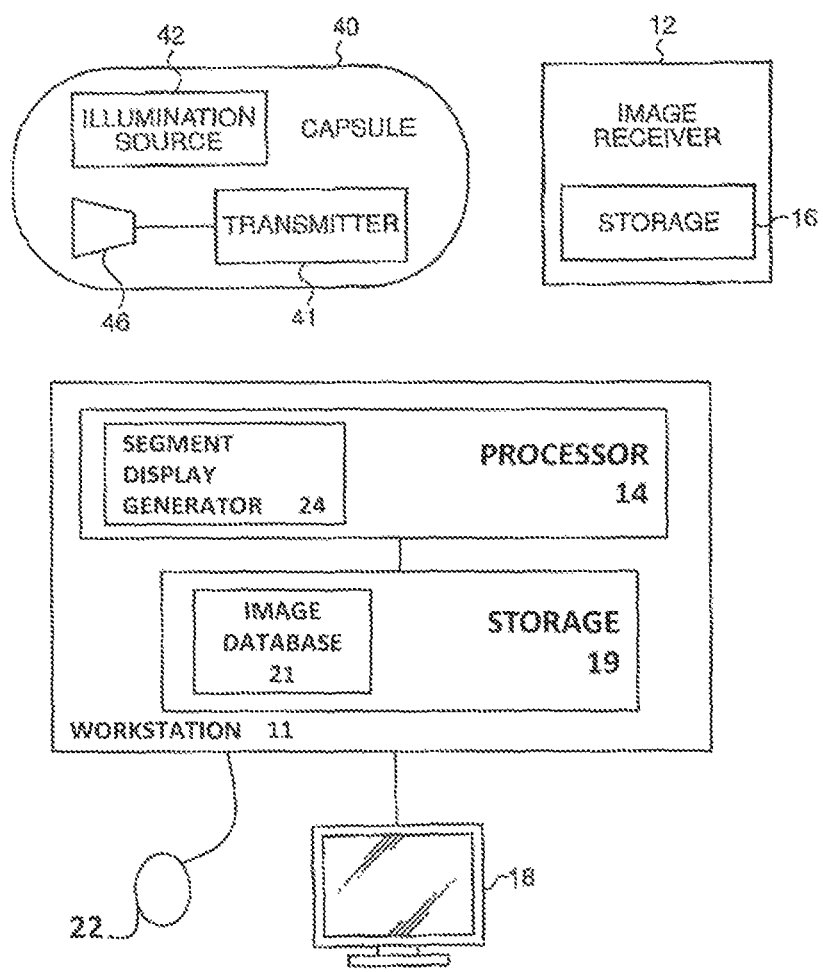
FIG. 1 shows a schematic diagram of an in-vivo imaging system according to an embodiment of the present invention.

It will be appreciated that for simplicity and clarity of illustration, elements shown in the figures have not necessarily been drawn to scale. For example, the dimensions and/or aspect ratio of some of the elements may be exaggerated relative to other elements for clarity. Further, where considered appropriate, reference numerals may be repeated among the figures to indicate corresponding or analogous elements throughout the serial views.

DETAILED DESCRIPTION OF THE INVENTION

In the following description, various aspects of the present invention will be described. For purposes of explanation, specific configurations and details are set forth in order to provide a thorough understanding of the present invention. However, it will also be apparent to one skilled in the art that the present invention may be practiced without the specific details presented herein. Furthermore, well known features may be omitted or simplified in order not to obscure the present invention.

Unless specifically stated otherwise, as apparent from the following discussions, it is appreciated that throughout the specification discussions utilizing terms such as "processing", "computing", "storing", "determining", or the like, refer to the action and/or processes of a computer or computing system, or similar electronic computing device, that manipulate and/or transform data represented as physical, such as electronic, quantities within the computing system's registers and/or memories into other data similarly represented as physical quantities within the computing system's memories, registers or other such information storage, transmission or display devices.

Devices according to embodiments of the present invention, including imaging, receiving, processing, storage and/or display units suitable for use with embodiments of the present invention, may be similar to embodiments described in US Patent Application Publication Number 2006/0074275, entitled "System and Method for Editing an Image Stream Captured In-Vivo", U.S. Pat. No. 7,009,634 to Iddan et al., entitled "Device for In-Vivo Imaging", and/or US Patent Application Publication Number 2007/0118012, entitled "Method of Assembling an In-Vivo Imaging Device", each assigned to the common assignee of the present application, and each incorporated herein by reference in its entirety. Methods for analyzing motility within a GI tract based on comparison the images capture by an in vivo imaging capsule are disclosed, for example, in U.S. Pat. No. 6,944,316 to Glukhovsky et al., incorporated herein by reference in its entirety.

U.S. Pat. No. 7,215,338 to Horn et al., incorporated herein by reference in its entirety, discloses a system and a method for creating a summarized graphical presentation of a data stream captured in-vivo. The graphical presentation may be in the form of a color bar. Devices and systems as described herein may have other configurations and other sets of components. Devices, systems and methods according to embodiments of the present invention may be similar to the commercial PillCam® SB2 or PillCam® Colon capsules and the associated data recorders and RAPID® workstation provided by Given Imaging, Ltd.

An in vivo imaging capsule which may be swallowed by a patient, may progress passively along the GI tract, due to peristaltic contractions which move the intestinal tissue walls. During its journey, the capsule passes through different GI organs, such as the esophagus, the stomach, the small bowel and the colon. The capsule may capture images at different image capture rates. Due to the relatively narrow tunnel structure of the small bowel tissue walls, while the capsule is traveling in the small bowel, it may maintain a position which is parallel to the direction of the tunnel. The longitudinal axis of the imaging capsule may generally remain parallel to the direction that the capsule advances in the small bowel. One or more imaging systems of the capsule may be positioned in at least one of the longitudinal ends of the capsule, such that the imaging is performed generally in a forward and/or backward looking position, to capture images of the opening and closing of the lumen quite regularly. Image data capturing the intestinal tissue walls and/or the opening and closing of the lumen hole, in combination with the recordation of the time of capturing each image, may permit analysis, display and/or calculation of properties or diagnoses of the patient's GI tract. For example, intestinal motility events, or type and frequency of peristaltic activity, or the amount of intestinal content which is depicted in the images may be analyzed. Embodiments of the invention may enable segmented display of analyzed information of the GI tract to a medical professional in an efficient way, which may assist diagnosis or determination of the patient's condition.

According to embodiments of the invention, images of movement of intestinal tissue walls may be classified as depicting different categories of intestinal events. In some embodiments, intestinal events may be detected over a sequence of several consecutive image frames. The following categories are examples of intestinal events:

1) "contraction"—movement of intestinal walls and/or lumen;
2) "static closed lumen"—paralyzed or substantially motionless intestine with a closed lumen hole;
3) "tunnel"—paralyzed or substantially motionless intestine with open lumen; and
4) "turbid lumen"—lumen hole and/or wall occluded by intestinal content.

Other categories may be used in addition or instead.

Obtaining a significant amount of image data may allow a detailed analysis of physiological condition. However, the large amounts of the data may require a long duration of video visualization, therefore diagnosis of a study by the physician may take a relatively long time. Detection, characterization and display of specific segments or portions of the image stream which have similar frame properties may be performed according to embodiments of the present invention. Such display may be useful for determining diagnosis or assessing condition of a patient by the physician.

In one example, when reviewing and analyzing a patient's condition, a physician may be interested to view points of transition of the in vivo imaging device during the image capturing procedure, e.g. transition of the imaging capsule from the esophagus to the stomach, transition from the stomach into the small bowel (e.g. duodenum detection), and/or transition from the small bowel into the colon (e.g., cecum detection).

In another example, in the area of intestinal motility, it may be useful to display to a physician which motility events occurred in different segments of the GI tract. Intestinal motility event analysis may be performed and displayed, e.g. as disclosed in US Published Patent Application 2015-0016700. For example, a summarized graphical display may indicate segments of the GI tract in which a certain level of intestinal activity was detected. Areas of the GI tract in which a high level of activity was detected (e.g., a high frequency of contractions) may be displayed, as well as segments of the GI tract in which substantially no contractions or a very low number of contractions occurred.

In yet another example, it may be useful to display a summarized graphical display which segments the GI tract according to the amount or level of intestinal turbid content which was detected in the images. The summarized graphical display may indicate segments of the GI tract in which a high amount of turbid intestinal content was detected, and/or segments which were detected as clean of turbid content. The level of intestinal content may be related to detected segments of lumen diameter opening in the images, and such information may be graphically presented alongside the summarized display of the intestinal content segments.

Embodiments of the present invention describe a system and method for displaying summarized in vivo data, based on analysis and processing of data extracted from image frames captured in the GI tract. Each image frame may be represented as a two-dimensional array of pixels, for example a rectangular or square pixel array of a certain height and a certain width (e.g., 320×320 pixels or 1000× 1000 pixels). Each pixel may consist of one or more bits of information, representing the brightness of the image at that point and possibly including color information which may be encoded as RGB (red, green, blue) values. Data which relates to the image capture timestamp and/or to the position of the in vivo device while capturing the image, may be encoded and transmitted either separately or along with the frame pixel data.

Analysis and processing of the image data may be performed automatically by a processing device, without user intervention. The display of summarized graphical data, for example using a color bar, window or display may be performed, e.g., by one or more processors, a workstation, circuitry, a detector or any other computation device. According to some embodiments of the present invention, one or more summarized graphical display windows or bars may be displayed to a health professional for diagnosis.

Reference is made to FIG. 1, which illustrates a schematic diagram of an in-vivo imaging system according to an embodiment of the present invention. In an exemplary embodiment, the system includes a capsule 40 having one or more imagers 46, for capturing images, one or more illumination sources 42, for illuminating the body lumen, and a transmitter 41, for transmitting image and possibly other information to a receiving device. Typically, the image capture device may correspond to embodiments described in in U.S. Pat. No. 7,009,634 to Iddan et al., and/or in U.S Published Patent Application No. 2007-0118012 to Gilad, each incorporated by reference herein in its entirety, but in alternate embodiments may be other sorts of image capture devices. The images captured by the imager system may be of any suitable shape including for example circular, square, rectangular, octagonal, hexagonal, etc. Typically, located outside the patient's body in one or more locations are an image receiver 12, typically including an antenna or antenna array, an image receiver storage unit 16, a data processor 14 (e.g., a central processing unit, processing unit, computer processor or computer controller), a data processor storage unit 19, and an image monitor or visual display unit 18, for displaying, inter alia, images recorded by the capsule 40. Data processor storage unit 19 includes an image database 21.

Typically, data processor 14, data processor storage unit 19 (e.g., a memory) and monitor 18 are part of a personal computer or workstation 11, which includes standard components such as processor 14, a memory, a disk drive, and input-output devices such as a mouse and keyboard, although alternate configurations are possible. Data processor 14 may include any standard data processor, such as a microprocessor, multiprocessor, accelerator board, or any other serial or parallel high performance data processor. Data processor 14, as part of its functionality, may act as a controller controlling the display of the images (e.g., which images, the location of the images among various windows, the timing or duration of display of images, etc.). Image monitor 18 is typically a conventional video display, but may, in addition, be any other device capable of providing image or other data. The image monitor 18 presents image data, typically in the form of still and moving pictures, motility data and in addition may present other information. In an exemplary embodiment, the various categories of information are displayed in windows. A window may be for example a section or area (possibly delineated or bordered) on a display or monitor; other windows may be used. Multiple monitors may be used to display images, motility properties, motility events and other data, for example an image monitor may also be included in image receiver 12. In contrast to a window which is used as a section or area of a display, when used in the context of a sequence of frames, a window of a set or sequence (e.g., ordered by time of capture or receipt, or another ordering) of frames may be a sequential subset of image frames within a stream of image frames. When used herein a subset of image frames is typically a sequence or set of frames chosen from a larger sequence or set of frames.

In operation, imager 46 captures images and may send data representing the images to transmitter 41, which transmits images to image receiver 12 (e.g., as frames) using, for example, electromagnetic radio waves. Image receiver 12 transfers the image data to image receiver storage unit 16. After a certain period of time of data collection, the image data stored in storage unit 16 may be sent to the data processor 14 or the data processor storage unit 19. For example, the image receiver 12 or image receiver storage unit 16 may be taken off the patient's body and connected to the personal computer or workstation which includes the data processor 14 and data processor storage unit 19 via a standard data link, e.g., a serial, parallel, USB, or wireless interface of known construction. The image data is then transferred from the image receiver storage unit 16 to an image database 21 within data processor storage unit 19. Typically, the image stream is stored as a series of images in the image database 21, which may be implemented in a variety of known manners. Data processor 14 may analyze the data and provide the analyzed data to the image monitor 18, where a user views the image data. For example, data processor 14, or another data processor (e.g. in receiver 12) may process images and create a motility bar according to embodiments of the present invention. Data processor 14 operates software that, in conjunction with basic operating software such as an operating system and device drivers, controls the operation of data processor 14. Typically, the software controlling data processor 14 includes code written in the C++ language, and may be implemented using various development platforms such as Microsoft's .NET platform, but may be implemented in a variety of known methods.

The image data recorded and transmitted by the capsule 40 may be digital color image data, although in alternate embodiments other image formats may be used. In an exemplary embodiment, each frame of image data includes 320 rows of 320 pixels each (e.g., 320 rows and 320 columns), each pixel including bytes for color and brightness, according to known methods. For example, each imager pixel may include a color sensor which may correspond to a single primary color, such as red, green, or blue. The brightness of the overall pixel may be recorded by a one byte (i.e., 0-255) brightness value. Images may be stored, for example sequentially, in data processor storage unit 19. The stored data is comprised of one or more pixel values, including color and brightness. Other image formats may be used.

Data processor storage unit 19 may store a series of images recorded by a capsule 40. The images the capsule 40 records, for example, as it moves through a patient's GI tract may be combined consecutively to form a series of images displayable as an image stream. When viewing the image stream, the user is typically presented with one or more windows on monitor 18; in alternate embodiments multiple windows need not be used and only the image stream may be displayed. In an embodiment where multiple windows are provided, for example, an image window may provide the image stream, or still portions of that image. Another window may include buttons or other controls that may alter the display of the image; for example, stop, play, pause, capture image, step, fast-forward, rewind, or other controls. Such controls may be activated by, for example, a pointing device such as a mouse or a finger on a touch screen. Typically, the image stream may be frozen to view one frame, speeded up, or reversed; sections may be skipped; or any other method for viewing an image may be applied to the image stream.

Data processor 14 may include, or may be operationally connected to, a segment display generator 24. Segment display generator 24 may process images from the captured set of images, and may calculate a set of pixel-based properties of the images to determine points of segmentation of the image stream. The segmented presentation may be generated and displayed in a predetermined section of the graphical user interface (GUI). Segment display generator 24 may produce a segment display, e.g. a segment color bar or other graphical presentation, calculated based on pixel-based properties of at least a portion of frames from the image stream.

Pixel-based properties or descriptors of an image frame, when referred to herein, may include features or functions calculated based on pixel values of the corresponding image frame or a plurality of image frames. For a single image frame, a set of various pixel-based properties may be calculated, and the set may be referred to as a vector of properties.

In order to generate a segment display, a set of images from the image stream may be provided to or accessed by segment display generator 24. The set of images may include, for example, all images captured by the imaging device. In some embodiments, a subset of images may be used for generation of a segment bar. An image bar may be e.g., a display where, moving linearly along the display, change indicates change within the image stream. Such a bar may be e.g., rectangular, but may be a different shape. The subset of images may be selected, according to different selection criteria, e.g. as disclosed in U.S. Pat. No. 7,986,337 to Davidson et al., incorporated by reference herein in its entirety, which discloses editing methods of an in vivo image stream, to create a shortened movie.

In one example, a subset of images used for generating a segment bar may include images captured between certain anatomical landmarks which may be identified in the image stream, e.g. the duodenum, the cecal valve, the Z-line (indicating entrance to the stomach), etc. Two anatomical landmarks may be selected (e.g. may be predetermined in the system, or selected by a user) and all images captured during the time the capsule traveled from a selected anatomical landmark which was captured first to the selected anatomical landmark which was captured later, may be included in the generation of a segment bar. In another example, images may be selected according to color parameters, image quality parameters, number of detected pathology candidates in the image, etc. The segment bar may be generated for selected organs (esophagus, small bowel, colon, stomach, etc.), or for a specified duration of time selected from the complete imaging procedure (for example, the first 2 hours). In yet another example, images may be merged or fused, e.g. based on similarity between adjacent images, and a segment bar may be generated based on the subset of fused or merged images. Other image selection methods may be used for determining or selecting the subset of images. Different image selection methods may be combined for producing the subset of images which may be used in the generation of a segment bar.

The segment display generator 24 may extract or calculate properties of pixels in the subset of frames, e.g. based on R, G, and/or B pixel color values, pixel brightness values, or other frame-related and/or pixel-related values which may be extracted from image data and stored in a storage unit, e.g. storage unit 19 and/or storage unit 16 and/or image database 21. In some embodiments, the segment display generator 24 may extract or calculate properties from data of a summarized graphical representation, e.g. a color bar displaying average colors of each image frame in an image stream, or a motility events bar displaying motility events based on pixel lines selected from each image frame. A color bar or color chart may be a display or graphic, typically (but not exclusively) a rectangle including a series of strips or lines of color, each strip or line summarizing, e.g., using a color, one or more reference frames.

The segment display generator 24 may detect segments of constant mean values in the extracted or calculated sets of pixel-based properties. A data window or set of sequential (e.g., sequential in time or order or capture or receipt) frames may be selected by segment display generator 24 from the image stream, for example in an initial stage a predetermined number of sequential frames may be selected from the image stream or from a subset thereof. The segment display generator 24 may determine potential or possible partition points of the window of frames. A partition point or a split may be a construct, data item, or point within a sequence or window of frames which divides, splits or segments the window of sequential frames into two adjacent sub-windows of sequential frames. For example, in a data window comprising four image frames sequentially numbered from 1 to 4, there may be three possible partition points—the first possible partition point divides the window into a first sub-window with frame #1, and a second sub-window with frames #2, #3 and #4. The second possible partition point divides the window into a first sub-window with frames #1 and #2, and a second sub-window with frames #3 and #4. The third possible partition point divides the window into a first sub-window with frames #1, #2 and #3, and a second sub-window with frame #4.

For one or more possible partition points of the window (or for all possible partition points), segment display generator 24 may calculate a difference between mean values of the sets of pixel-based properties for each sub-window of frames, the two sub-windows determined by the corresponding partition point. A difference measure, or a difference score, or a normalized difference may be calculated, for example by calculating a function that assigns a strictly positive value to each vector or each set of pixel-based properties. In one example, a p-norm value may be assigned as the difference measure. A value p may be selected for computing the p-norm value of the difference between mean values, and the p-norm of the difference may be calculated. The p-norm value $\|x\|_p$ for a set of pixel-based properties x which includes n pixel-based properties $x_i$ may be calculated according to the following equation:

$$\|x\|_p := \left( \sum_{i=1}^{n} |x_i|^p \right)^{1/p}. \qquad \text{(equation 1)}$$

Segment display generator 24 may identify points of change in the calculated difference (or in the difference measures), for example by comparing the difference measure (e.g. the p-norm of the difference) to a segmentation threshold. If the difference measure between mean values of the sets of pixel-based properties for each sub-window of frames is larger than (or equal to) the segmentation threshold, a point of change in the image stream may be determined, equivalent to (or corresponding to) the partition point pertaining to the sub-windows for which the difference was calculated. Similarly, points of change in all image frames, or a subset thereof, may be detected. In one example, p=2, and the p-norm is calculated as the Euclidean norm.

Based on the detected points of change in the image stream, segment display generator 24 may generate a summarized representation of the image stream on a visual display unit or monitor (e.g. monitor 18). The summarized representation may include a plurality of segments, each segment calculated based on the detected points of change in the image stream. Each segment in the summarized representation may represent or correspond to a subset or a section of sequential image frames from the image stream, for which a constant mean value was detected using the sets of pixel-based properties. For example, in a segmentation of the image stream based on pixel-based properties pertaining to motility events, each segment may indicate a portion of the image stream in which the image frames depict or pertain to a certain motility characteristic or a certain motility event. For example, the segments which may be visualized by a motility segment bar calculated for an image stream may include: a segment of contractions density below a certain threshold value, a segment of contraction density above a certain threshold value, a segment with no contractions (tunnel segment), a turbid segment (high intestinal content), etc. In another example, a segmentation of the image stream may be based on average pixel colors of the image frames. Different average colors may indicate different organs or portions of the GI tract. For example, a reddish color may be typical in the stomach, while a pinkish color may be typical of the small bowel, and a greenish-brown may be typical of the colon. The segment display generator 24 may applied to a stream of in vivo images, and pixel-based properties pertaining to average frame colors may be calculated. The image stream may be segmented to multiple segments, each segment substantially corresponding to an organ of the GI according to the average color detected in the segment.

The segment display generator 24 may assign a visually-different value (e.g., a color value, a texture, etc.) to each of the detected segments, and display the assigned values sequentially in a visual representation such as a graph, bar or chart. For example, average colors of detected segments may be displayed in a color bar, wherein the color of each segment in the bar represents the average color of image frames corresponding to the detected segment. In another example, if the image stream is segmented according to motility events, predetermined colors or values may be assigned to each category of motility events, and the graphic visual representation may include a color bar or chart which includes segments representing categories of detected motility events that are marked according to the predetermined colors. For example, a green color may represent a turbid segment, a red color may represent a high contraction density segment, and a black color may represent a tunnel segment. The different colors or values may be assigned to the segment according to levels of the detected set of properties. For example, a scale of white to black may be used in a visual summarized representation of an image stream segmented according to turbid content properties. A white segment may indicate that the image frames in the corresponding segment are clean, or substantially with no content, and a black segment may indicate that the image frames in the corresponding segment are very turbid. Different gray levels may correspond to different percentages of average turbid content in the corresponding portions of image frames. In yet another example, at least one pixel property calculated for an image frame indicates a diameter of an intestinal lumen hole detected in the image frame. Segments of the image stream which include image frames with an intestinal lumen diameter within a predetermined range may be mapped to a range of predetermined values and displayed in the segment bar. The segment bar may be used as a tool to assist a physician's diagnosis of a patient by displaying a visible trend or pattern of the intestinal lumen diameter presented in the segment bar. Although the above examples include colors, it is noted that the segment bar may be visualized using different methods, such as textures or patterns, in order to enable the user easy visual differentiate between segments.

The segment display generator 24 may obtain or receive (e.g. from a storage unit or a database or as user input), or may determine, a confidence value $\delta$. The confidence value $\delta$ may be correlated to a probability that a point of change is incorrectly determined or detected in the image stream. For example, the confidence value $\delta$ may indicate a maximum probability that an incorrect detection of a point of change in the calculated difference between mean values of the sets of pixel-based properties occurred.

The generated segment bar may be used for visualization of GI organs, contractile events, turbid segments of the image stream, velocity changes of the in vivo device, or any other property or feature which may be extracted and/or detected based on the data obtained during the imaging procedure. For example, a pathology detector such as an ulcer detector may detect ulcer candidates and assign ulcer scores to frames of the image stream. A segment bar may divide the image stream into a plurality of segments, wherein each segment corresponds to a constant mean ulcer score. The segment bar generated by segment display generator 24 may assist a physician in diagnosis or monitoring of the patient's disease, or in detection of clinically important events or trends which may be deduced from the segment bar.

According to some embodiments, the segment bar need not be displayed, and may be used (e.g. by a processor such as processor 14) for automatic analysis of the image stream based on the selected properties. For example, points of change may be determined based on the generated segment bar, and a visual indication or labeling of the points of change may be marked or displayed in a GUI, for example on a time bar indicating the time the image was captured.

Segment display generator 24 and other modules or processes discussed herein may be, or may be executed by processor 14 or another processor executing software, and thus in some embodiments processor 14 may include segment display generator 24 or other components or modules discussed herein. For example segment display generator 24 may be software or code executed by processor 14. Other methods may be used; for example segment display generator 24 may be dedicated hardware or circuitry.

Figure 2A:
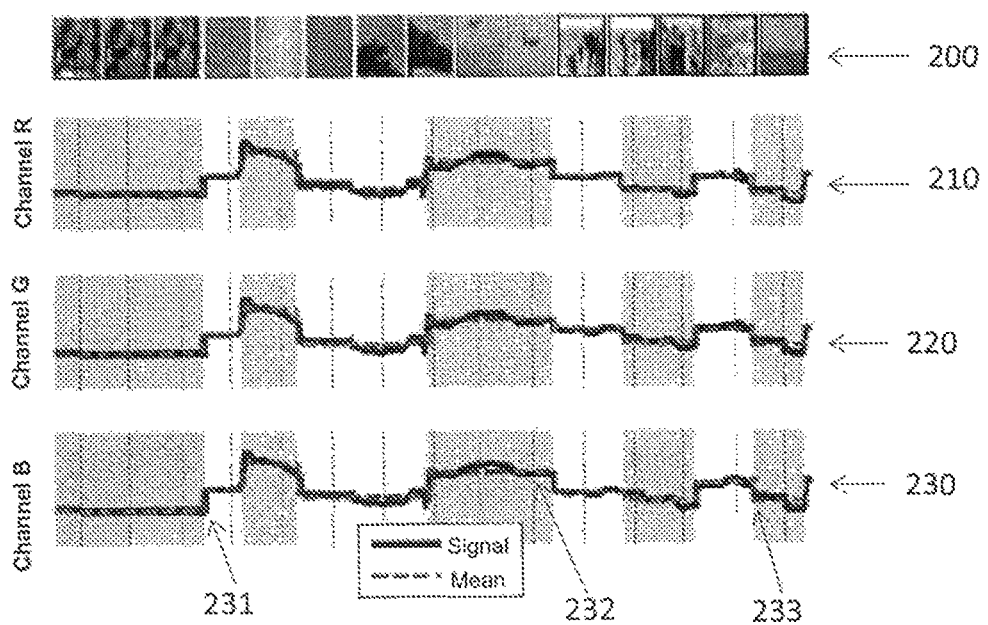
FIG. 2A is an exemplary result of segmentation of an image stream based on constant mean segment detection in three-dimensional color signal according to embodiments of the invention.

In embodiments of the present invention, sequential analysis of frames is proposed using a robust method for the analysis of multivariate data streams. An embodiment of the method detects segments of constant norm of mean values obtained from the k-dimensional data stream. An embodiment of the method can be seen as change point detector, since the detected points of change determine the segments of constant mean values. An exemplary result of constant mean segment detection in three dimensional color signal is shown in FIG. 2. The images shown in row 200 represent sample images from an image stream (e.g., a video stream). For every frame, the average R, G and B values are calculated (solid lines of graphs 210, 220 and 230 respectively). The video segments with constant means for every channel of R, G and B are detected and marked with a dashed line. The points of change in the image stream are the points in which the dashed line changes its value, for each one of the channel. For example, point 231 shows a detected increase of the B channel mean value, while point 232 is an example of a point within a segment, which does not indicate a change in the mean values of channel B. Point 233 shows a detected decrease of the B channel mean value.

Accurately analysis of streaming data whose nature is changing over time is one of the core problems in data mining, pattern recognition and machine learning. The streaming data are constantly arriving and, generally, labels that define or categorize the data are not available at the moment a new sample arrives. Moreover, streaming data analysis algorithms must deal with limited memory availability and limited processing time per item.

Some problems may be considered when handling streaming data. For example: detecting when a significant change occurs in the distribution of the data stream, deciding which examples must be kept in memory and which ones to forget (to optimize the memory used for data stream analysis), and revising the actual model whenever a significant change has been detected. Since the streaming data algorithms have no direct access to underlying data distribution but to samples drawn from this distribution, they should conclude on the distribution changes (or drifts) analysing only the received samples. A difficult problem in handling distribution changes is distinguishing between true distribution changes and noise. Algorithms can misleadingly treat noise as distribution changes. In the literature, this problem is overcome by the use of robust statistical hypothesis tests, confidence intervals or concentration inequalities. Concentration inequalities provide probability bounds on how a random variable deviates from its expectation. Hoeffding's inequality and Bernstein's inequality are examples of concentration inequalities.

A non-parametrical method for sequence-based adaptive sliding window called AdWin, was proposed in 2006 by Albert Bifet and Ricard Gavalda. The AdWin method is based on analyzing the content of a sliding window, whose size is not fixed a priori, but is recomputed online according to the rate of change of the contents of the window itself. A sliding window may be for example a subset of data or images which may be moved across a sequence of data. A sliding window defined by a certain length of time may be for example a subset of data spanning that time frame, e.g., images captured over a period of one minute. In some embodiments, a sliding window may be defined by a certain number of image frames, for example 100 frames. As a result of the AdWin algorithm, the window increases its length when the data is stationary and shrinks automatically when a change takes place. The criteria to grow/shrink the sliding window are based on concentration inequalities (Hoeffding's inequality). As a result, rigorous guarantees on the performance of the AdWin algorithm are proposed. Moreover, the algorithm uses a variant of the exponential histogram technique to compress the window. Thus, in order to keep a window of size W, it uses O(log W) memory and O(log W) processing time per item. Unfortunately, the bounds derived in AdWin are only valid for one dimensional data streams, which makes the method difficult to apply to computer vision problems where properties have a dimensionality higher than one, such as color histogram change detection in video sequences or structural changes in scenes represented by histograms of oriented gradients. In an embodiment of the present invention, a generalization of the bounds are proposed, to derive a new algorithm to detect the change of the mean in multidimensional data streams. Embodiments of the present invention monitor the k-dimensional means inside an adaptive window and determines whenever there is a partition in two sets inside the current window, whose k-dimensional means are significantly different. In order to detect a significant change between the two k-dimensional means, a norm of the mean is calculated. Embodiments may provide rigorous guarantees on the confidence of the detected change and can be applied to any data distribution. An embodiment can be applied with any norm $L_p$ for $p=1, 2, \ldots, n$.

The bound for the norm of k-dimensional means may be defined for example as follows: n samples are obtained from a vector x, then with probability at least $1-\delta$, the vector of expected values of $X_j$ is within $$\epsilon \text{ of } \frac{1}{n} \sum_{i=1}^{n} X_{i,j}$$

under the p-norm, where:

$$\epsilon = k^{1/p} \left( \frac{1}{2n} \ln \frac{2k}{\delta} \right)^{\frac{1}{2}} \quad \text{(equation 2)}$$

Figure 2B:
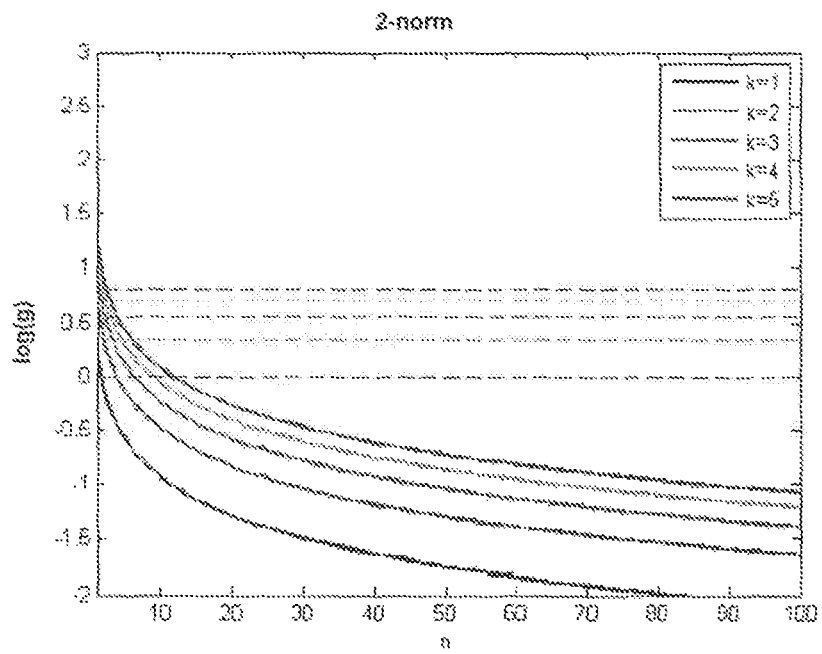
FIGS. 2B-2C illustrate the behavior of a segmentation threshold for different values of data dimensionality k and norm p according to embodiments of the invention.
Figure 2C:
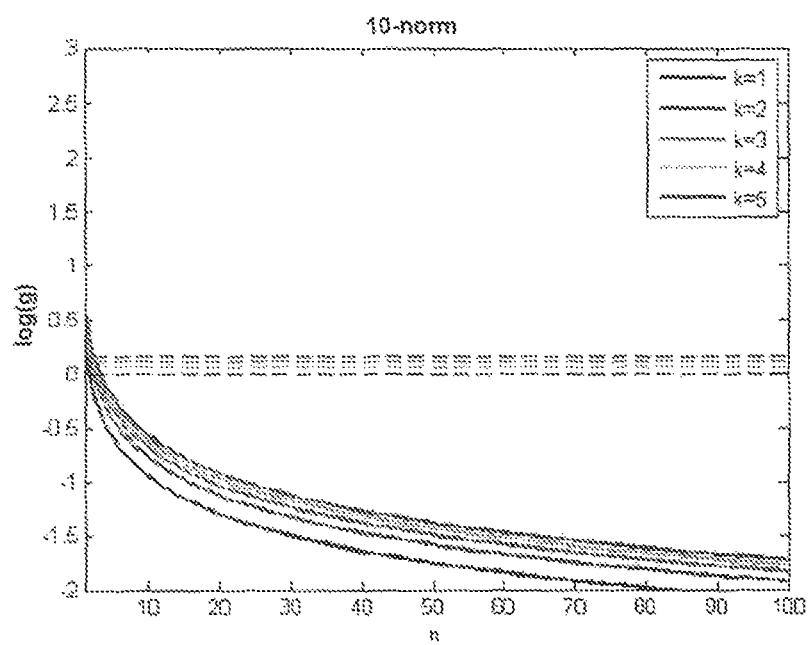

Example behavior of the segmentation threshold $\epsilon$ from equation 2 is illustrated for different values of data dimensionality k and norm p in FIGS. 2B and 2C. The figures are plotted in a logarithmic scale, FIG. 2B is for p-norm value of p=2, the number (n) of samples or vectors indicated on the x-axis n=100, and the dimensionality k (e.g., the amount of components of the vector x) is 1 to 5. For k=1, the plot presents the Hoeffding's bound and for this k, the algorithm is independent of the chosen value p. Given a confidence value $\delta$ (which may be predetermined in one example, or provided as input by a user in another example), the higher the dimension k is, the more samples n the bound needs in order to reach the same value of $\epsilon$. As can be determined from FIGS. 2B and 2C, the higher norm is used (p value), the less important the dimensionality k becomes.

An adaptive windowing algorithm for multivariate data streams is proposed according to embodiments of the invention. For a given data stream of data vectors $\vec{x}_1, \vec{x}_2, \ldots, \vec{x}_t, \ldots$, each observation $\vec{x}_i = [x_i^1, x_i^2, \ldots, x_i^k]^T$, $i=1, 2, \ldots, t, \ldots$ is a k-dimensional vector. Each sample $\vec{x}_i$ is generated according to some multivariate distribution $D_i$. Each $x_i^j \in [0, 1]$. $\vec{\mu} = [\mu^1, \mu^2, \ldots \mu^k]^T$ is defined as the expected value of $\vec{x}$, and $\vec{\hat{\mu}} = [\hat{\mu}_W^1, \hat{\mu}_W^2, \ldots, \hat{\mu}_W^k]^T$ is defined as the estimated mean within the window of frames W.

An embodiment of the method begins with an initial window W. At each step t of the algorithm, the next data vector $\vec{x}_t$ is added from the data stream, thus increasing the size of window W by one. All possible bi-partitions (or sub-windows) $W_0 \cdot W_1$ of the window W are determined, and the means of each possible sub-window is calculated. When the p-norm of differences between the calculated means of a sub-windows is greater than or equal to segmentation threshold $\epsilon_{cut}$, we can reduce the size of the window W by dropping the oldest stream elements $W_0$. Note that one of the advantages of an embodiment of the method is that it has only one parameter: the confidence value $\delta \in (0, 1)$.

An adaptive windowing algorithm for a k-dimensional space may include some or all of the following steps:

Input: multivariate data stream $\vec{x}_1, \vec{x}_2, \ldots, \vec{x}_t, \ldots$
Input: $\delta$ parameter
  1: Initialize window W
  2: for each $t > 0$ do
    3: $W \leftarrow W \cup \{\vec{x}_t\}$ {add $\vec{x}_t$ to the head of W}
    4: while exist a split of W into $W = W_0 \cdot W_1$ such that $||\vec{\hat{\mu}_{W_0}} - \vec{\hat{\mu}_{W_1}}||_p \geq \epsilon_{cut}$ do
    5:   Drop elements of $W_0$ from the tail of W
    6: end while
Output: $\vec{\hat{\mu}_W}$ and $\vec{\hat{\mu}_{W_0}}$ Guarantees on the bounds of the algorithm may be defined based on a confidence level $\delta$. If $||\vec{\mu}||_p$ remains almost constant within W, the probability that the algorithm shrinks the window at this step is at most $\delta$. If for some partition of W into two parts $W_0 \cdot W_1$, wherein $W_1$ contains the most recently added data vectors, $\|\mu\overrightarrow{W_0}-\mu\overrightarrow{W_1}\|_p > 2\epsilon_{cut}$, then, with probability 1−δ, the algorithm shrinks W to $W_1$ or shorter.

If the means have changed sufficiently, the data comes from the distributions centered around different means. Let n, $n_0$ and $n_1$ denote the sizes of the windows W, $W_0$ and $W_1$ respectively. The segmentation threshold value $\epsilon_{cut}$ that is obtained is:

$$\epsilon_{cut} = k^{1/p}\left(\frac{1}{2m}\ln\frac{4}{k\delta'}\right)^{\frac{1}{2}} \quad \text{(equation 3)}$$

where $\delta' = \frac{\delta}{n}$ and $m = \frac{1}{1/n_0 + 1/n_1}$.

Figure 3A:
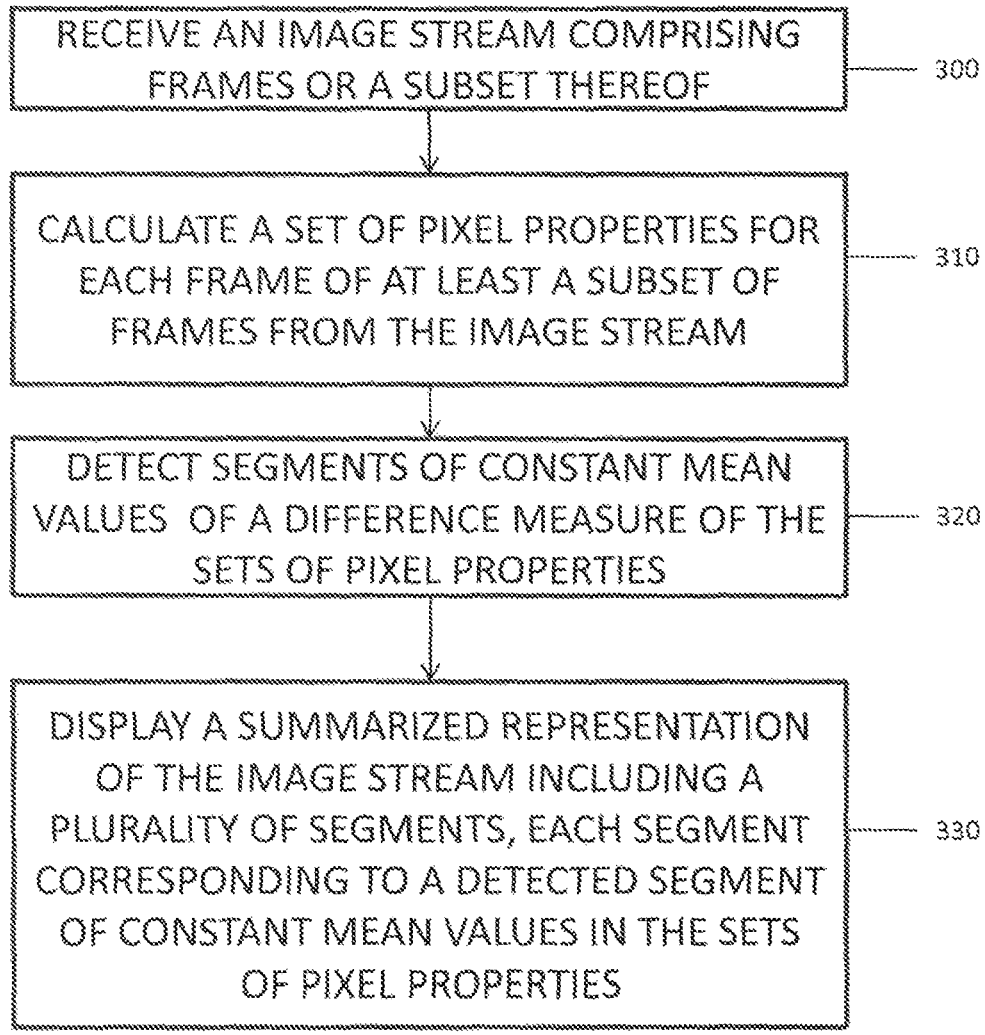
FIGS. 3A-3B illustrate a flow chart of a method for segmentation of an input image stream, based on the adaptive windowing algorithm according to embodiments of the present invention
Figure 3B:
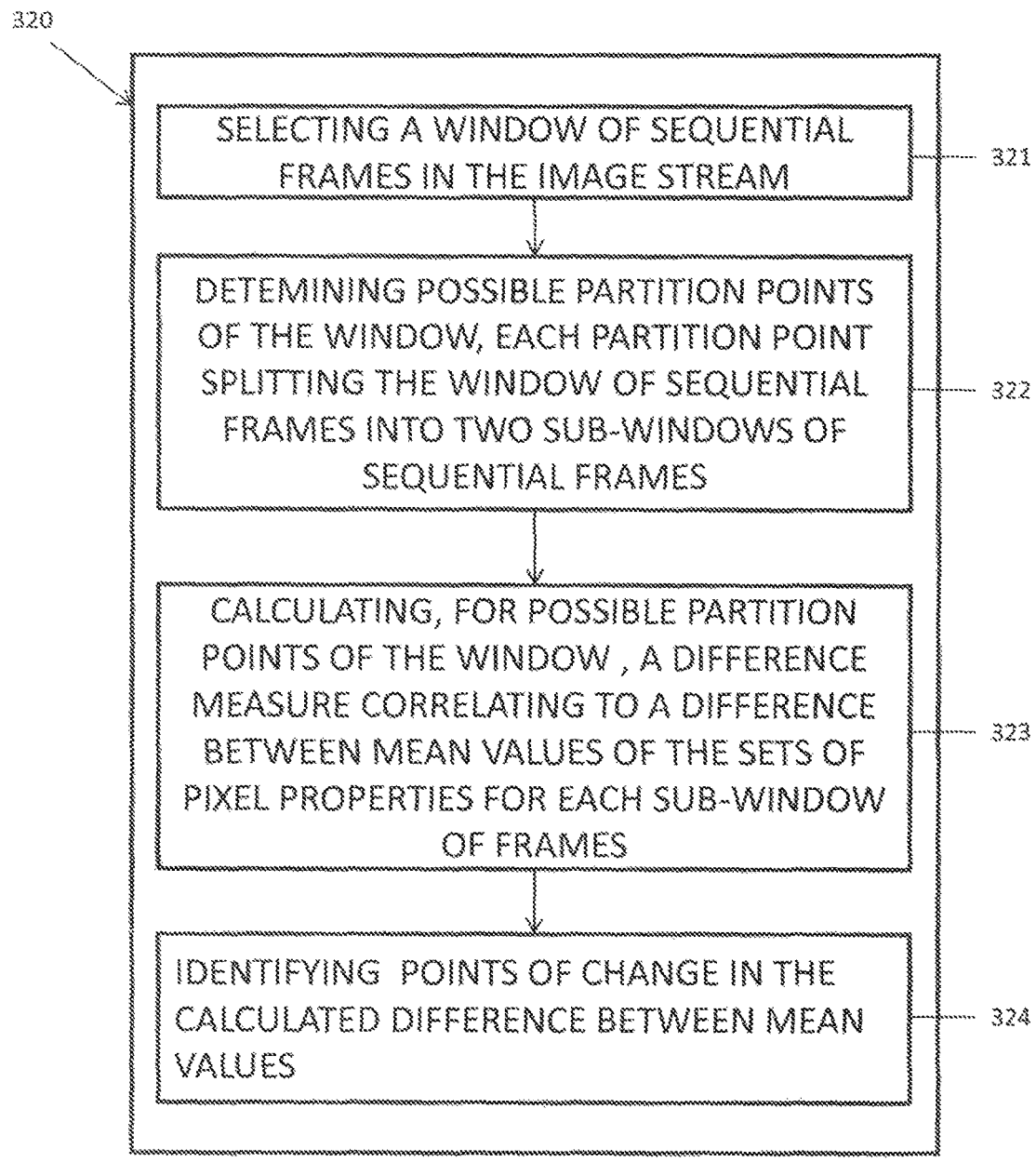

FIGS. 3A and 3B illustrate a flow chart of a method for segmentation, or segment analysis, of an image stream, based on an adaptive windowing algorithm according to embodiments of the present invention. In operation 300, an image stream comprising frames (or a subset thereof) may be received. The image stream may be obtained by an in vivo imaging device capturing images sequentially, e.g. device 40, and may be stored in a storage unit e.g. storage unit 19 or image database 21. In one example, all frames captured during an in vivo imaging procedure may be used for the segmentation analysis. In another example, only a subset of frames obtained during an imaging procedure may be selected for the analysis, e.g. according to predetermined conditions. In operation 310, a set of pixel-based properties may be calculated, e.g. by a processor such as processor 14, for each frame of at least a subset of the received frames from the image stream. The set of pixel-based properties referred to herein may include for example a plurality of features or properties (e.g. a vector of features or a vector of properties). An image frame property may be calculated according to a predetermined function or method, based on pixel values (e.g. RGB values) of one or more corresponding image frames, from which the pixel values were taken. For each image frame, a plurality of property values may be calculated using different functions or calculations or analysis. One example of a pixel-based property is an average color value of an image frame or of a portion of an image frame. Another example of a pixel-based property is a level of turbid intestinal content detected in an image based on the pixel values. Another example of a pixel-based property is a density of contractions detected in a sequence of image frames. Any parameter calculated based on pixel values of one or more image frames may be considered or defined as a pixel-based property. In some examples, a property may be calculated based on a plurality of image frames. A calculated property value (and/or a property vector or a set of property values) typically correspond to one image frame, but may, in some embodiments, correspond to a plurality of image frames.

In operation 320, segments of constant mean values may be detected in the sets of pixel-based properties. FIG. 3B is a detailed set of operations which may be performed for detecting the segments of constant mean values in the sets of pixel-based properties. In operation 321, an initial window of sequential frames in the image stream may be selected. For example a window of 2, 5 or 10 sequential frames may be selected from the image stream or from the subset of frames. It is important to note that sequential frames in a subset of frames selected for segment analysis (operation 300) may not necessarily be sequential in the complete image stream. In operation 322, possible partition points of the selected window may be determined. Each partition point or split splits the window of sequential frames into two adjacent sub-windows of sequential frames. In operation 323, for possible partition points of the window (e.g. for each possible partition point, or for a subset thereof), a difference between mean values of sets of pixel-based properties for each sub-window of frames may be calculated. A difference measure or a score correlating to the difference may be calculated using the difference between mean values of sets of pixel-based properties. For example, in one embodiment, a p-value may be received as an input parameter (e.g. predetermined and stored in a storage unit which is accessed by the processing unit, or received as input from a user, or calculated based on other data). Using the p-value, the processing unit may compute a p-norm value of the difference between the mean values of sets of pixel-based properties for each sub-window of frames. The p-norm value may be calculated according to, for example, equation 1, and may be defined as the difference measure. Other methods for calculating a difference measure, or a score of the difference between mean values of sets of pixel-based properties for each sub-window of frames may be used.

In operation 324, points of change in the difference measure, e.g. in the p-norm value of the difference between mean values, may be detected or identified. In one example, the points of change may be detected by comparing the calculated difference measure to a segmentation threshold. In some cases, more than one possible point of partition may be detected in a window (e.g. may be above the segmentation threshold), and the partition point which provides the maximal difference or the maximal difference measure may be determined as a point of change.

Optionally, in operation 330, a summarized representation of the image stream including a plurality of segments may be displayed. Each segment corresponds to a detected segment of constant mean values in the sets of pixel-based properties. The segments may be visually or graphically displayed to provide a valuable data for a reviewing physician. For example, the segment bar may allow the physician to quickly focus on important points of change or transition in the image stream. The points of transition may indicate segments of similar characteristics, based on the pixel-based properties which were calculated. Various data may be concluded from a graphical segment representation. For example, if the property is calculated based on average frame color, a passage of the in vivo device from one in vivo organ to another may be determined based on the detected segments, since in vivo organs are known to have different typical average colors. In another example, if the property is calculated based on turbid intestinal content levels, segments of the image stream which include a high level of intestinal content may be marked. Similarly, the image stream or a subset thereof may be divided into segments based on other pixel-based properties or features.

Figure 4A:
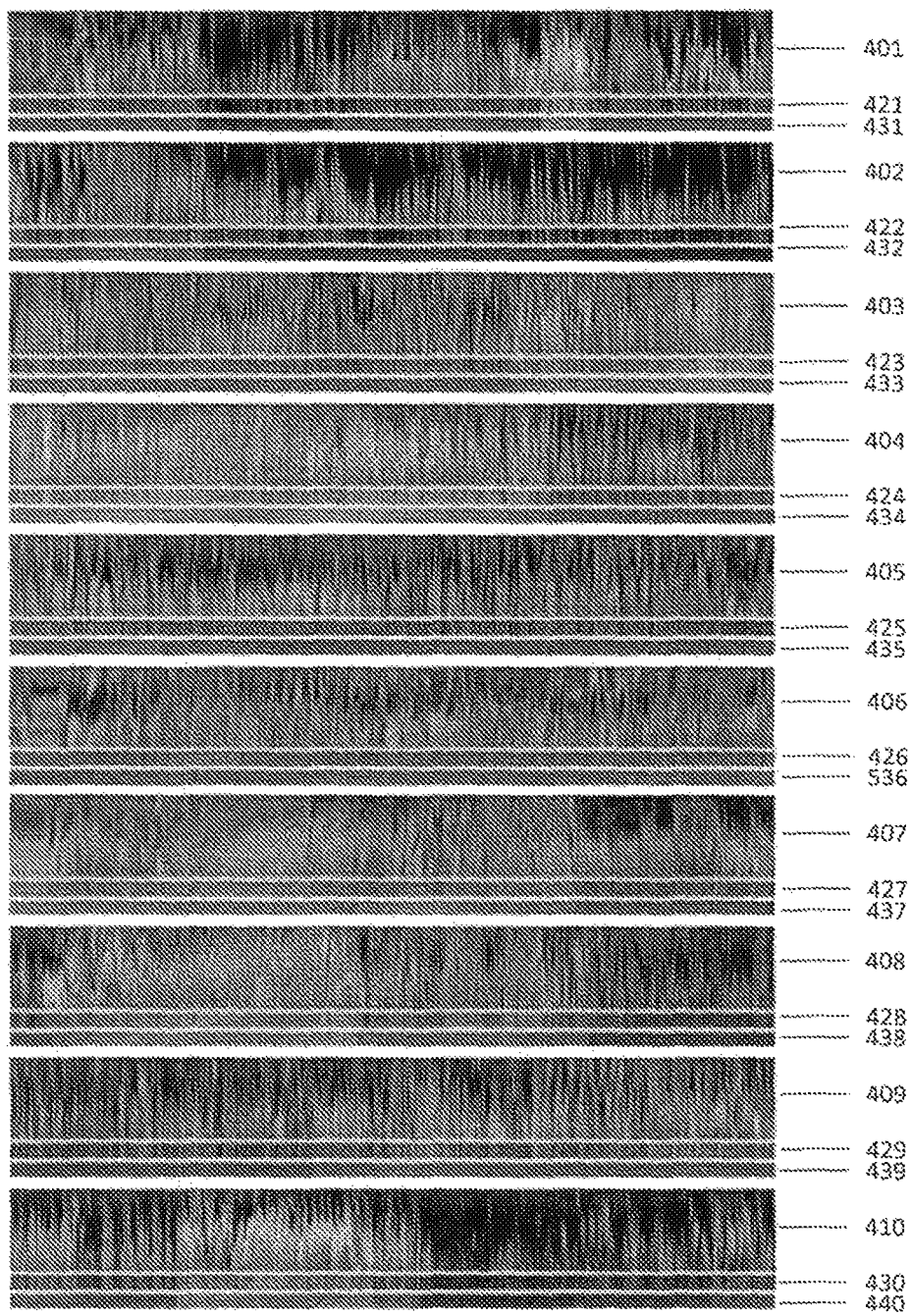
FIGS. 4A-4B show a first embodiment of an adaptive windowing algorithm for a k-dimensional space applied to detect change in color signal of a motility events bar.
Figure 4B:
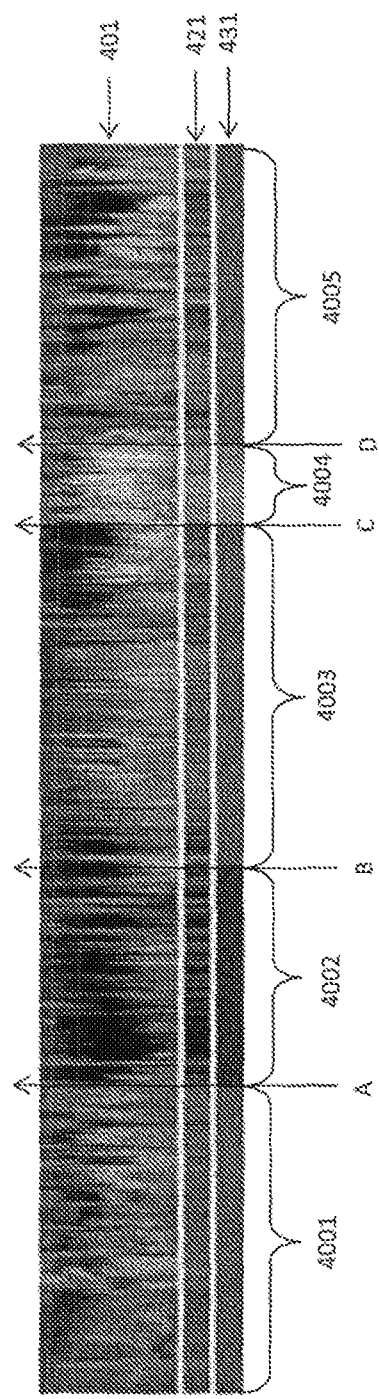
Figure 4C:
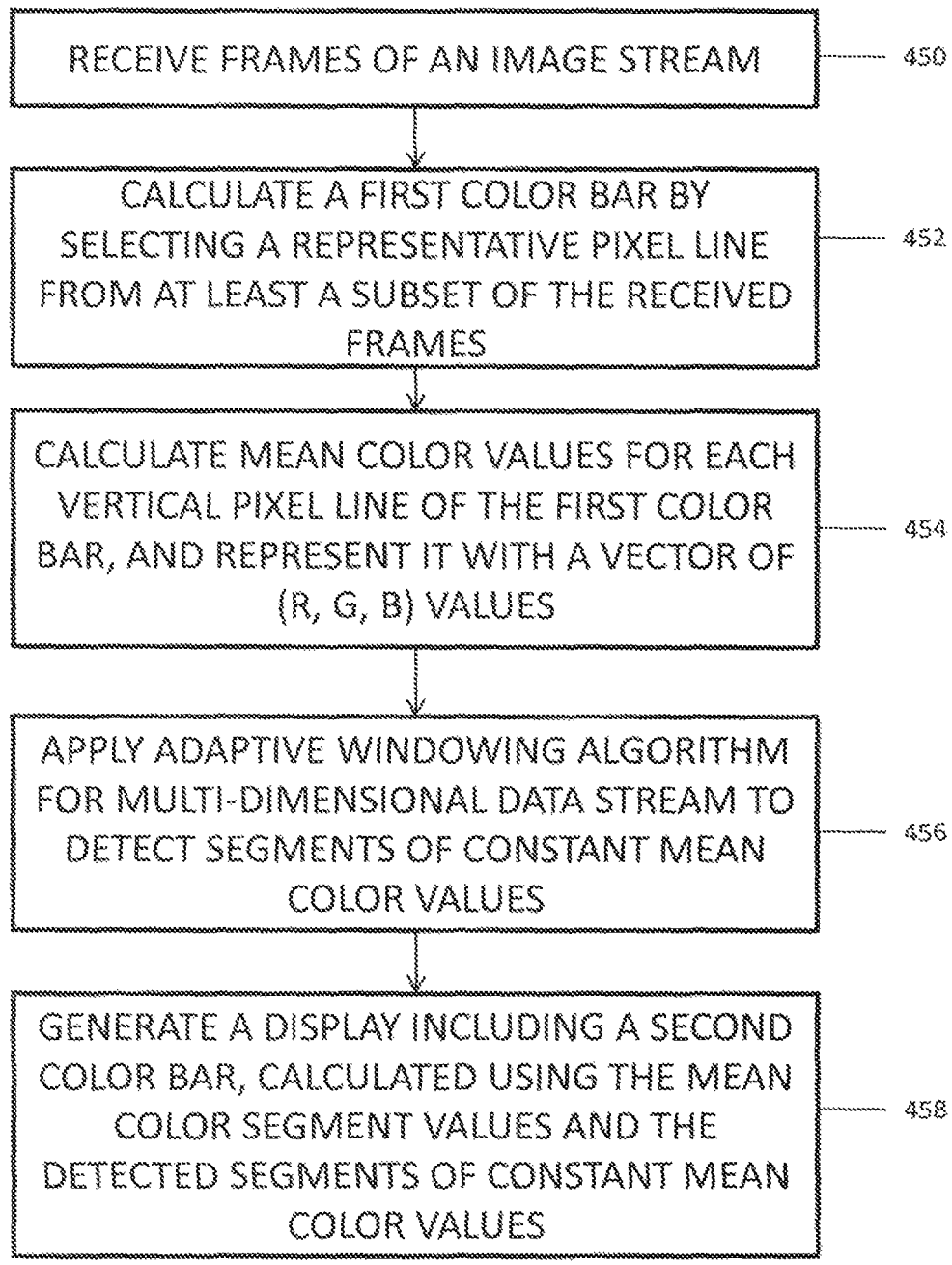
FIG. 4C is a flow chart of a method for generating a segment bar according to a first embodiment.

In the first embodiment shown in FIGS. 4A-4C, an adaptive windowing algorithm for a k-dimensional space is applied to estimate the change in color signal of a calculated motility events bar. A motility events bar may be calculated, for example, as described in US Published Patent Application 2015-0016700, which is assigned to the common assignee of the present invention and is incorporated by reference herein in its entirety. US Published Patent Application 2015-0016700 discloses in some embodiments a method for generating display of intestinal motility events in an image stream captured by an in vivo imaging device, by receiving an image stream captured by an in vivo device, the image stream including image frames, each frame containing a plurality of image pixels arranged in an array. A strip of pixels is selected from each image, for example of at least a subset of images of the image stream. The selected strips may be aligned or arranged in a spatial arrangement, e.g. adjacently, to form a motility events bar. The subset of images may include one or more sequences of consecutive image frames from the image stream.

US Published Patent Application 2015-0016700 discloses in some embodiments that the motility events bar may be displayed, on a computer monitor or display or another visual display unit. In some embodiments, the strip of pixels may include one or more lines (e.g., straight lines) of pixels selected from an image frame. A video display of the image stream may be displayed, for example alongside the motility events bar. Different methods may be used for selecting strips of pixels from images to form a motility bar. For example, a fixed point in each image frame may be determined, and the selected strip of pixels may be selected to pass through the fixed point. The fixed point may be, for example, the center of the image frame. In another example, the selection of pixel strips may be adaptive, and may depend on certain criteria for selection, such as detected areas or features in each image, or may include certain conditions based on image properties or pixel-based properties in images.

In the present example shown in FIGS. 4A and 4B, a lumen hole was detected in each image frame from the image stream, and a strip of pixels which passes through the detected lumen hole in each image frame was selected, such that the selected strip maximizes the visibility of the lumen hole in the generated motility events bar shown in bars 401-410.

The present method obtains the points in which color changes, and the result is a segmented video stream, which may be displayed in different ways. In FIG. 4A, the motility events bar is displayed in ten bars 401-410. Each of bars 401-410 represents information extracted from pixels of, for example, 2400 frames captured by an in vivo capsule endoscope. In each of bars 421-430, the mean color of the corresponding vertical line in the corresponding motility bar portion is calculated and shown as a line of a single color, which may be represented by a vector of three values: R, G and B. In each of segment bars 431-440, a summarized presentation of a portion of the image stream, which includes segments calculated for the mean color of the corresponding motility bar portion is shown. The following parameters were used: confidence level δ=0.1 and p-value p=2. As can be seen in bars 431-440, the segment bar divides the image stream into a plurality of constant mean segments, according to the mean color information of the motility bar.

FIG. 4B shows the first portion of the motility events bar in motility bar portion 401, which is equivalent to bar 401 of FIG. 4A. Similarly, bar 421 shows the mean color of the corresponding vertical line in motility bar portion 401, and segment bar 431 shows the segment bar portion calculated for the mean color of the motility bar portion 401. Points A, B, C and D are detected points of change in the portion of the image stream corresponding to the motility events bar portion 401, and determine the segments 4001-4005 of segment bar 431. Each segment corresponds to a sequence of image from the image stream, which may be characterized by a certain property or set of properties. In one example, each of these segments may be mapped to a certain motility event, for example by mapping or classifying it to a certain motility category or sub-category. Examples of intestinal motility categories include:

1) "contraction"—movement of intestinal walls and/or lumen;
2) "static closed lumen"—paralyzed or substantially motionless intestine with a closed lumen hole;
3) "tunnel"—paralyzed or substantially motionless intestine with open lumen; and
4) "turbid lumen"—lumen hole and/or wall occluded by intestinal content.

A motility category may be further divided into sub-categories—for example, a category of contractions may be divided according to the level of contractions that was detected in the image frames. The level of contractions may be measured, for example, as contractions per minute in the image stream. A segment may be classified as a high contractions density segment, a low contractions density segment, or a medium contractions density segment. Similarly, a turbid lumen category may be divided into sub-categories indicating the level of turbidity that was detected in the corresponding image frames. Other categories and/or sub-categories may be used.

For example, segment 4001 may include a sequence of frames from the image stream which depict a static closed lumen. Segment 4002 may include a sequence of frames which depict a high level of intestinal contractions density. Segment 4004 may include a sequence of frames which depict turbid intestinal content.

FIG. 4C is a flow chart of a method for generating a segment bar according to the first embodiment. In operation 450, a sequence of frames of an input image stream may be obtained, for example stored in a storage unit. The frames may include all frames captured during an in vivo imaging procedure or a portion thereof. In operation 452, a first color bar may be calculated, for example a motility events bar which was described above. The first color bar may include a single vertical line of pixels selected from each frame, according to predefined criteria. In operation 454, an average value of each vertical line of pixels may be calculated, for example an arithmetic mean or a weighted mean. In one example, the mean values may be represented as a vector of three color values, R, G and B, based on the RGB color space. Other color models or color spaces may be used e.g., HSV, CIE, CMKY, etc.

In operation 456, an adaptive windowing algorithm for a multi-dimensional data stream may be applied to the calculated mean RGB values, in order to detect segments in the (e.g., sequences of frames in the input image stream) of constant mean RGB values in the motility color bar. A window of sequential frames from the input sequence of frames may be selected in an initial step of the algorithm. In a next step, possible partitions of the data in the selected window may be calculated, each partition dividing the window into two sub-windows. For some or all of the possible partitions, a difference between mean values of the RGB vectors in each sub-window may be calculated. A measure of the difference, e.g. a difference score or normalized difference may be calculated, for example by calculating a p-norm of the difference between the mean values. The p-norm may be calculated using a p-value, which may be received from the user or predetermined (e.g. stored in a storage unit and accessed by the processing unit). A point of change in the difference between mean values or in the difference measure may be detected, for example by comparing the difference or the difference measure to calculated or predetermined segmentation threshold. If more than one partition point in a window passes the segmentation threshold, the partition point providing the maximal difference or difference measure may be defined as the point of change in a window. Based on the detected points of change, the input frames may be segmented into a plurality of distinct segments, each segment corresponding to a sequence of frames from the input image stream, and each segment being characterized by a constant mean value of the RGB values calculated for each frame. The output of the algorithm is the detected points of change, as well as the mean colors of each segment determined by these points.

Optionally, a display of a segmented graphical presentation of the input image stream operation 458 may be generated. For example, a segment bar may be generated using the mean colors of each calculated segment, and the detected points of change. The segment bar may be displayed in a graphical user interface, e.g. along with or in addition to a time bar indicating the time each image was captured in vivo, or in addition to a playable movie window which displays the image stream. In some embodiments, the detected points of change may be used to determine points of interest for a physician to review or mark in a report or an analysis of the image stream. Other displays or presentations of the calculated points of change and/or mean segment colors may be used.

Figure 5A:
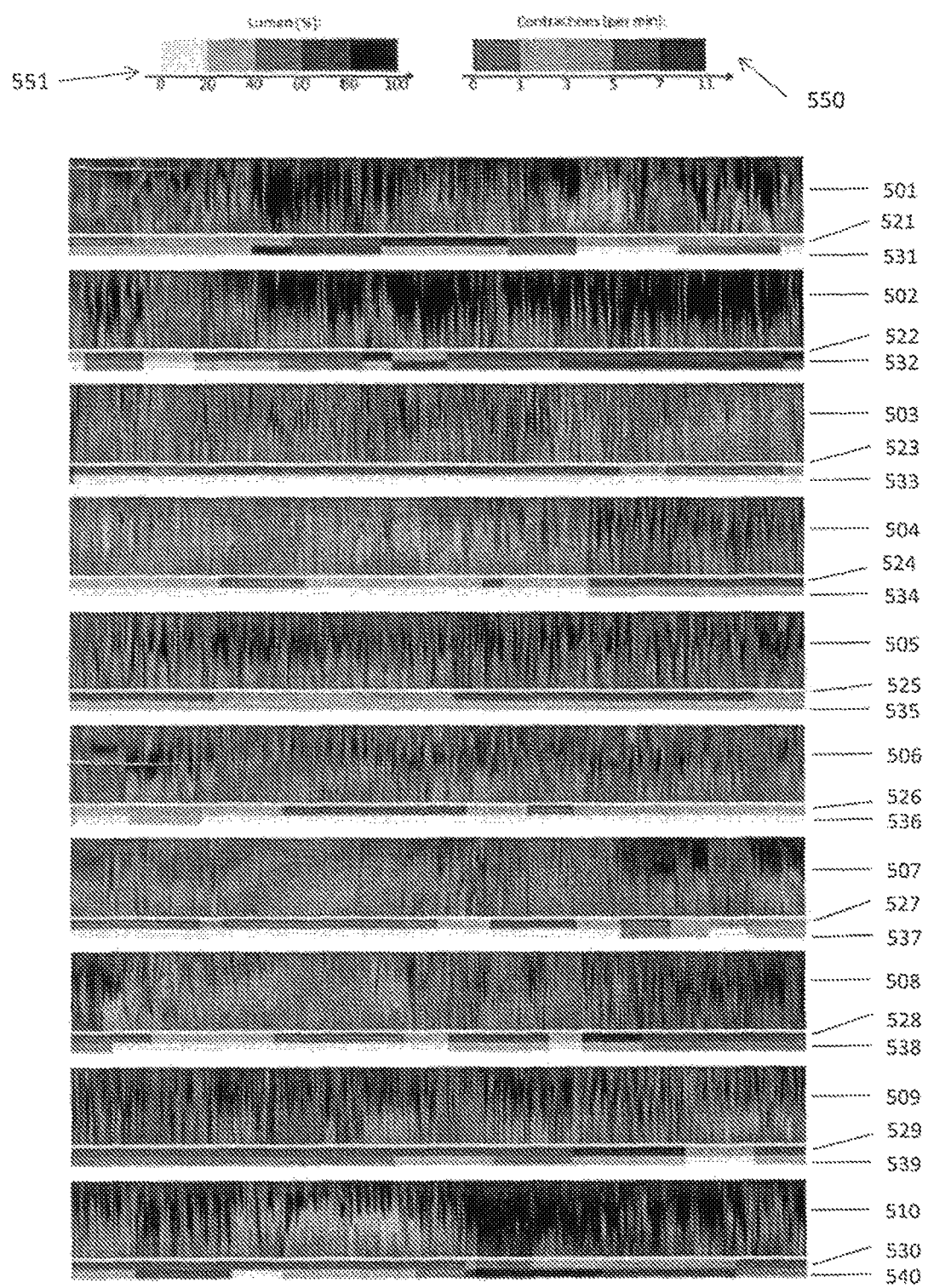
FIGS. 5A-5B show a second embodiment of an adaptive windowing algorithm for a k-dimensional space applied to detect change in lumen size and contraction density in frames of an image stream.
Figure 5B:
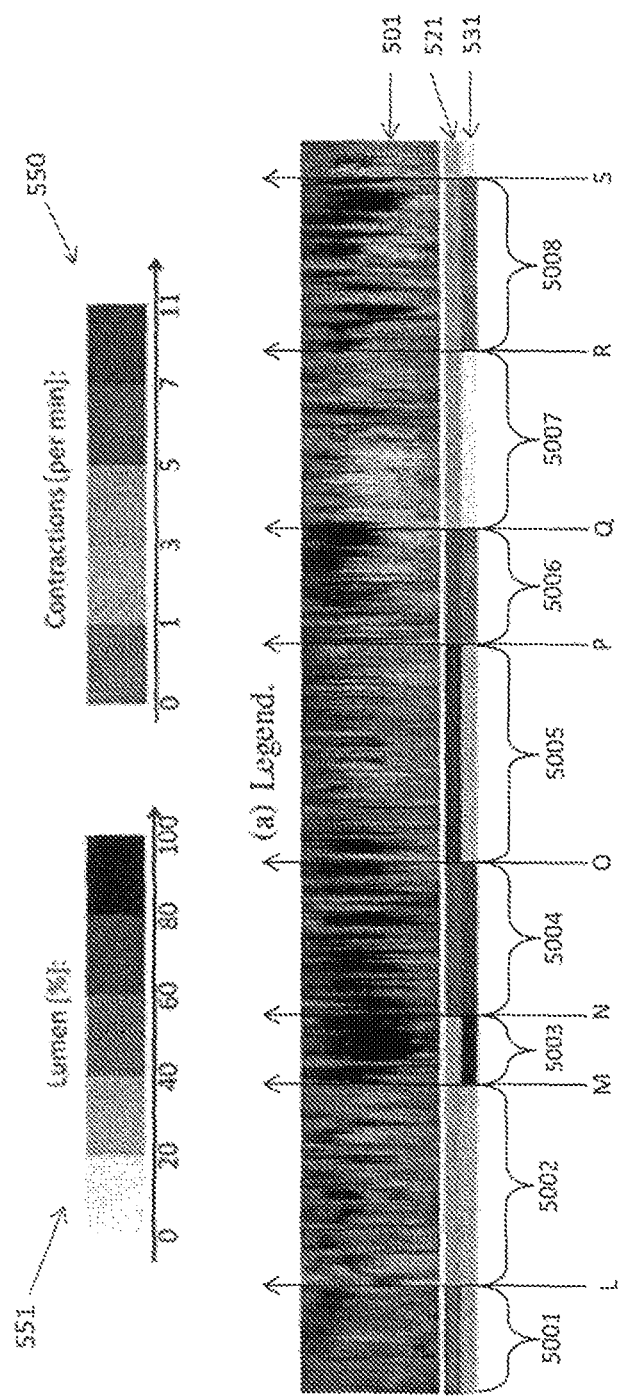
Figure 5C:
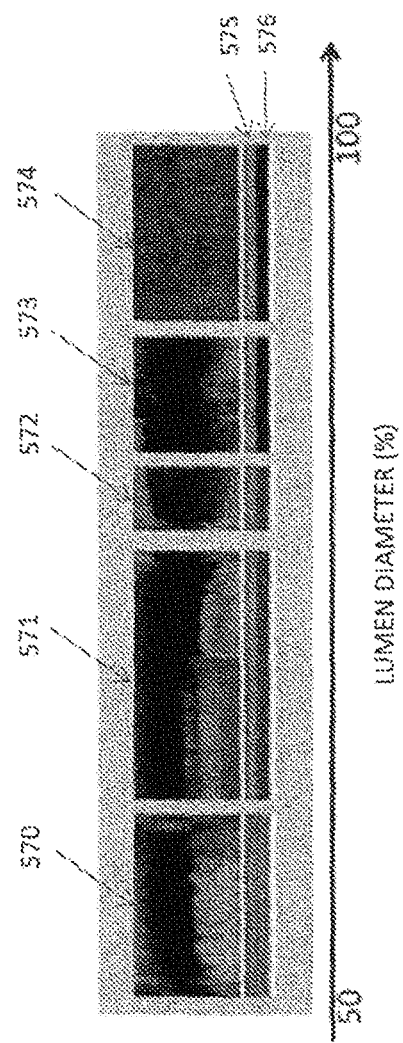
FIG. 5C is an example of tunnel segments detection according to the second embodiment of the invention.

In a second embodiment, an example of which is shown in FIGS. 5A-5C, the lumen size and the contraction density are evaluated jointly as a two-dimensional set of properties which are extracted or calculated based on pixel values of frames in the image stream. In this example, the confidence parameter $\delta$ may be set to, for example, $\delta$=0.1, and the p value may be set to, for example, p=2. The set of properties (e.g. pixel-based properties or features) which are used in this example include a contraction density property and a lumen size property.

A contraction density property, which is used as the first parameter or property in the set of properties, may be extracted from input image frames by calculating the number of contractions which occur during a predetermined time period, for example during a 1-minute period. The contraction density level may be color-coded, or mapped to a certain color value, for example as shown in color map 550, which maps a red color to a low contraction density level (e.g. 0-1 contractions per minute), and a blue color to a high contraction density level (e.g., 7-11 contractions pre minute). Intermediate colors are used for the intermediate contraction density values. Similarly, other colors may be used for mapping the contraction density levels (e.g., a gray-level color coding), and other visual presentations may be used instead of (or in addition to) colors.

A lumen diameter percent is used as the second parameter or property which is calculated based on the input image frames. The lumen is visually characterized in an input image frame as a region with low illumination intensity since the in vivo device's illumination is not reflected from an intestinal wall. The detection of the lumen is based on the analysis of light intensity in a frame. The image is converted to black and white, with black representing the lumen regions in the image, and white representing non-lumen regions. The results are converted to a numerical value, which represents the percentage of each line of pixels that is occupied by intestinal lumen. This value is calculated for each line of the motility bar. The value may be, for example, color coded or mapped to a range of colors, which visually indicate the percentage value. For example, in color map 551, a gray-level value is assigned to different ranges of detected lumen percentage. A maximum value in color map 551 (black) means that 100% of the corresponding segment of the motility bar represents a detected lumen region. The minimal value (white) means that no lumen was detected in the corresponding line of pixels. Other gray level colors are assigned to intermediate values of lumen percent in color map 551. In another example, the lumen percent property may be calculated without using a motility events bar—e.g., by detecting a lumen hole in the image frame, and computing the area percent of the lumen hole from the total pixels of the image frame.

FIG. 5A shows an exemplary display of a summarized representation of the image stream. The summarized representation includes a plurality of segments shown in bars 522-540, each segment corresponding to a segment of constant mean values in the sets of pixel-based properties.

In FIG. 5A, the motility events bar generated based on the image frames is displayed in ten bars 501-510. Each of bars 501-510 are equivalent to the respective motility events bars 401-410 which were shown in FIG. 4A. Each of bars 501-510 represents information extracted from (or calculated based on) pixels of, for example, 2400 frames captured by an in vivo capsule endoscope. In each of bars 521-530, a segment bar with color values indicating a range of contractions density of the respective frames of the image stream is shown. The segment bar displayed for the first property (contraction density in this example) may be generated according to the adaptive windowing algorithm for multi-dimensional data streams described in FIGS. 3A-3B. Each of segment bars 431-440 is generated for the second property (lumen diameter percent. The segment bars 431-440 may be generated according to the adaptive windowing algorithm for multi-dimensional data streams described in FIGS. 3A-3B.

The following parameters were used in this example: confidence level $\delta$=0.1 and p-value p=2. Segment bars 421-430 and 431-440 jointly divide the image stream into a plurality of constant mean segments, according to the color information extracted from the motility bar.

In other embodiments, different parameters may be used, and the pixel-based properties need not be based on a motility events bar. In one example, pixel-based properties used for calculating a segment bar may be extracted directly from the image frames, and not necessarily from a summarized color bar or color presentation. In another example, pixel-based properties used for calculating a segment bar may be extracted from a color bar which averages color data of each image, e.g. as disclosed in U.S. Pat. No. 7,636,092 to Horn et al.

FIG. 5B shows the first portion of the motility events bar in motility bar portion 501, which is equivalent to bar 501 of FIG. 5A. Segment bar 521 is a summarized presentation of a portion of the image stream, and includes segments with color values, each color value corresponding to a certain range of contractions density of the respective frames of the image stream, and segment bar 531 shows segments with color values indicating a range of lumen percent detected in pixel lines of the motility events bar.

Points L-S are detected points of change in the portion of the image stream corresponding to the motility events bar portion 501, and determine the joint segments 5001-5008 of segment bars 521 and 531. A segment is determined if at least one point of change was detected, either in the first property (contraction density) or in the second property (lumen percent). Each segment 5001-5008 corresponds to a sequence of images from the image stream, which may be characterized by a certain property or set of properties. Each of these segments may be mapped to a certain motility event, for example by mapping or classifying it to a certain motility category or sub-category.

The obtained segments in the motility bar, calculated for a 2-dimensional vector of a contraction density property and a lumen parameter property, can be used to define tunnel sequences or tunnel segments in the image stream. Tunnel sequences may include static lumen sequences with an open lumen, e.g. a sequence of images depicting an open lumen hole, which are substantially unchanging. Using the result of joint contraction density and lumen diameter analysis shown in FIGS. 5A and 5B, tunnel sequences can be detected, for example automatically using a processor. In FIG. 5C, examples of tunnel sequences or segments are shown. The tunnel segments are defined in this example as sequences with a lumen diameter larger than, for example, 50%, and a contraction density smaller than, for example, one contraction per minute. X axis indicates the percent of lumen diameter which is depicted in each vertical line of pixels in the motility event bar portions 570-574 of an image stream which are shown. Color bar 575 is the assigned color code of the density contractions property which was calculated for the image frames corresponding to the motility events bar portions 570-574, according to color map 550 of FIG. 5B, and color bar 576 is the assigned color code of the lumen diameter property which was calculated for the image frames corresponding to the motility events bar portions 570-574 according to color map 551 of FIG. 5B. The combined analysis of these two properties or features enable automatic detection of tunnel sequences in the image stream. The detected tunnel sequences, or data related to the detected tunnel sequences (e.g. percentage of the image stream which depicted tunnel sequences, or the number or frequency of tunnel sequences), may be displayed to a physician, e.g. in a report or automatic analysis of an image stream.

Figure 5D:
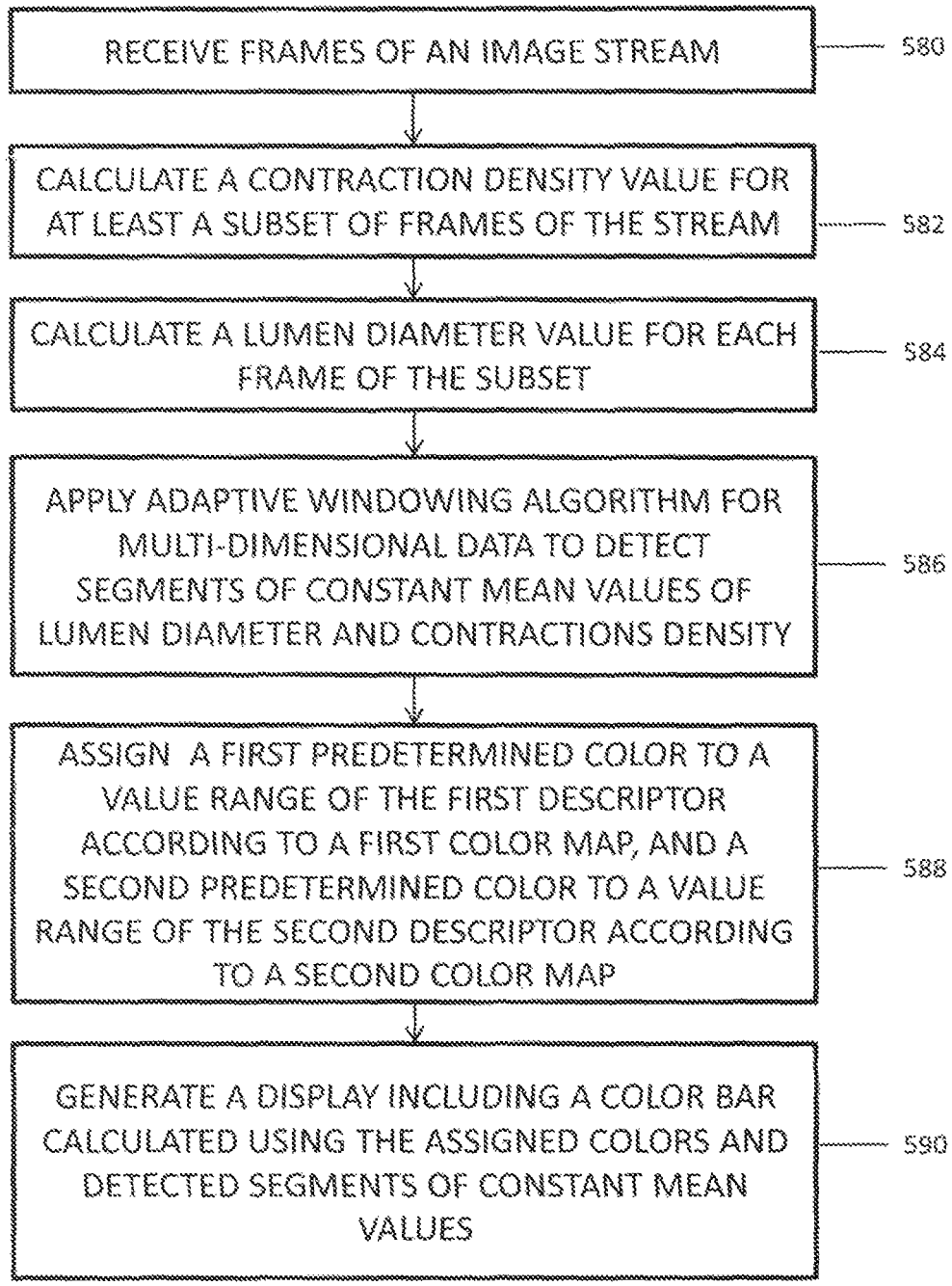
FIG. 5D is a flow chart of a method for segmentation of an image stream based on contraction density and lumen hole size, according to the second embodiment of the invention.

FIG. 5D is a flow chart of a method for analyzing an image stream of multi-dimensional data according to embodiments of the present invention. In operation 580, a subset of frames of an input image stream may be obtained for analysis, for example received from a recording device and stored in a storage unit. The frames may include all frames captured during an in vivo imaging procedure or a selected subset thereof. In operation 582, a first property or feature may be calculated for each frame (or at least for each of the subset of frames), for example a contractions density property which was described above. In some embodiments, the contractions density property may be calculated based on pixel data of the image frames, or based on a color bar (e.g. a motility events color bar) which was calculated based on pixel data of the image frames. In operation 584, a second parameter or feature may be calculated for each frame (or at least for each of the subset of frames), for example a lumen diameter property which was described above. In one example, the second property may correlate to a diameter of a lumen hole depicted in an image frame (which may be measured, e.g., by calculating the number of pixels which belong to the selected diameter), or to a percent of lumen pixels detected in a line which is selected to cross a lumen hole depicted in a frame. In another example, the second property may correlate to a lumen hole area (which may be measured, for example, by calculating the number of pixels of an image frame which belong to the detected lumen hole area) or percentage of an area in a frame which depicts a lumen hole. The first and second properties define the value of a property vector (or feature vector) for each frame which is included in the analysis.

In operation 586, an adaptive windowing algorithm for a multi-dimensional data stream may be applied to the calculated first and second properties for the subset of frames, in order to detect segments (e.g., sequences of frames in the input image stream) of constant mean values of the selected property vectors. A window of sequential frames from the input sequence of frames may be selected in an initial step of the adaptive windowing algorithm. Possible divisions or partitions of the frames in the selected window may be determined, each partition dividing the window into two sub-windows of sequential frames. In one example, for each possible partition, the difference between mean values of the property vectors in each sub-window may be calculated. A difference measure, e.g. a p-norm of the calculated differences between mean values, may be determined. One or more points of change in a difference measure (e.g. a p-norm value, for example the Euclidean norm if a p-value p=2 is used) of the mean value may be detected, e.g. by comparing the difference or the difference measure to a segmentation threshold. Based on the detected points of change, the analyzed frames may be segmented into a plurality of distinct segments, each segment corresponding to a sequence of frames from the analyzed image stream, and each segment being characterized by a constant mean value of the property vector values which were calculated for each frame. The output of the algorithm includes the detected points of change, as well as the mean values the property vectors of each segment determined by the detected points of change.

Optionally, in operation 588, a first predetermined color may be assigned to a value range of the first property, e.g. according to a first color map, and a second predetermined color may be assigned to a value range of the second property, e.g. according to a second color map. The assigned colors may be used to generate a display of a segmented graphical presentation of the input image stream operation 590. For example, a color bar or a segment bar may be generated using the colors which reflect the calculated mean property value in each detected segment, and the detected points of change. The segment bar may be displayed in a graphical user interface, e.g. along with or in addition to a time bar indicating the time each image was captured in vivo, or in addition to a playback movie window which displays frames of the image stream. In some embodiments, the detected points of change may be used to determine points of interest for a physician to review or mark in a report or an analysis of the image stream. Other displays or presentations of the calculated points of change and/or calculated mean property values in each segment may be used.

Figure 6A:
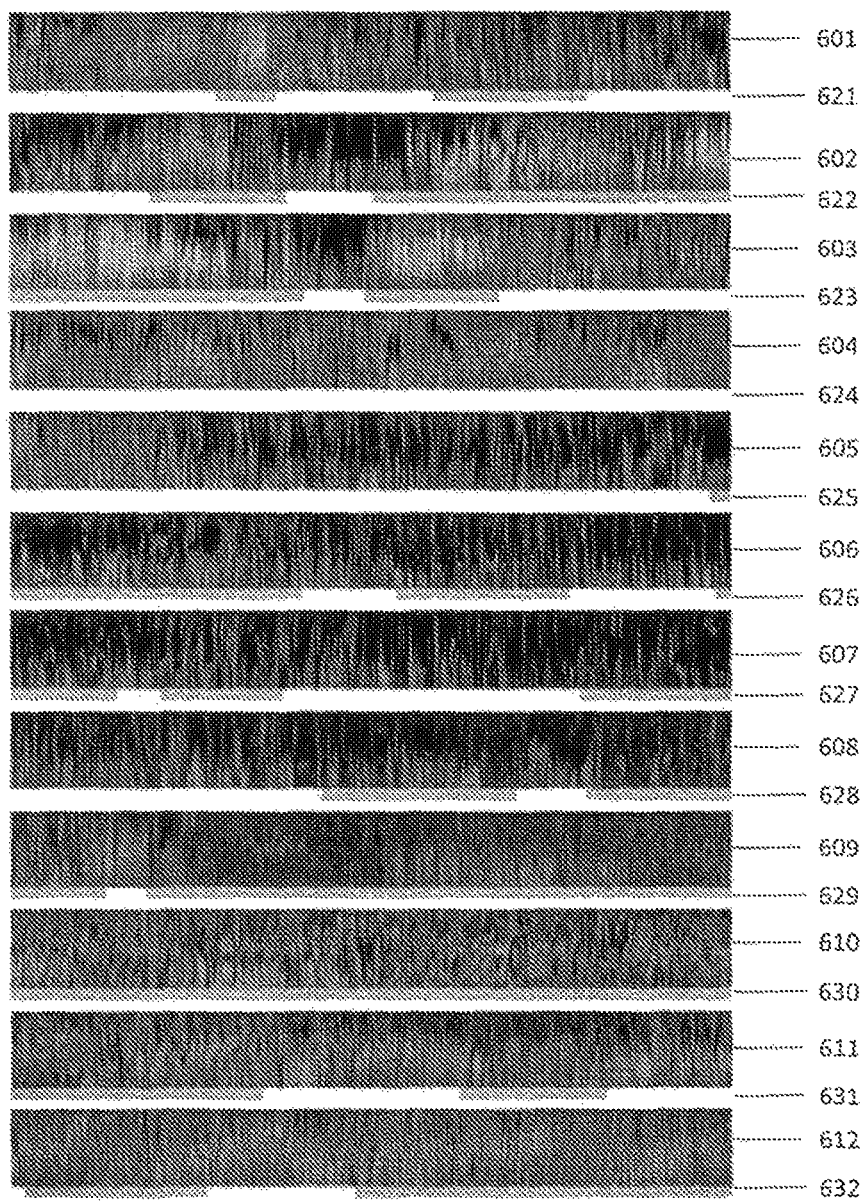
FIGS. 6A-6B depict an exemplary segmentation of an image stream based on intestinal content levels detected in the image frame.

Reference is now made to FIG. 6A, which is an exemplary segmentation of an image stream based on intestinal content levels detected in the image frames. The feature vector or property vector includes, in this case, only a single component which correlates to the intestinal content level calculated for an image frame. An intestinal content level property may be calculated based on pixel values of the image frame, for example as disclosed in U.S. Pat. No. 7,577,283 to Zinaty et al., incorporated herein by reference in its entirety. In another example, an intestinal content value may be calculated by using a classifier to classify mean RGB values of image pixels into two categories, e.g. "turbid" pixels depicting intestinal content, and "clear" pixels depicting tissue. Other methods may be used.

The intestinal content level property may be correlated to the percentage of content which is depicted in an image frame, or to a level of cleanliness of the frame. The motility events bar shown in bars 601-612 of FIG. 6A is equivalent to the motility events bar which was shown in FIGS. 4A and 5A. The lumen hole was detected in each image frame from the image stream, and a strip of pixels which passes through the detected lumen hole in each image frame was selected, such that the selected strip maximizes the visibility of the lumen hole in the generated motility events bar shown in bars 601-610. Each of bars 601-610 represents information extracted from (or calculated based on) pixels of, for example, 2400 frames captured by an in vivo capsule endoscope.

Intestinal content segmentation bars 621-632 indicate whether the image stream segment passed a certain content level threshold or not. The gray segments indicate that the corresponding image frames depict a level of intestinal contents which is higher than (or equal to) the predetermined threshold, and the white segments of intestinal content segmentation bars 621-632 indicate that the corresponding image frames of the analyzed images depict a level of intestinal contents which is lower than the predetermined threshold. In the present example shown, the content threshold was set to 30%, e.g. if more than 30% of frames inside a one-minute sliding window are detected as intestinal content frames, an intestinal content sequence is defined. Otherwise, a clean sequence is detected. In order to be able to apply the sequential analysis, similar to the contractions density property, the density of the content detection of frames was estimated using the frames in a one-minute sliding window.

Figure 6B:
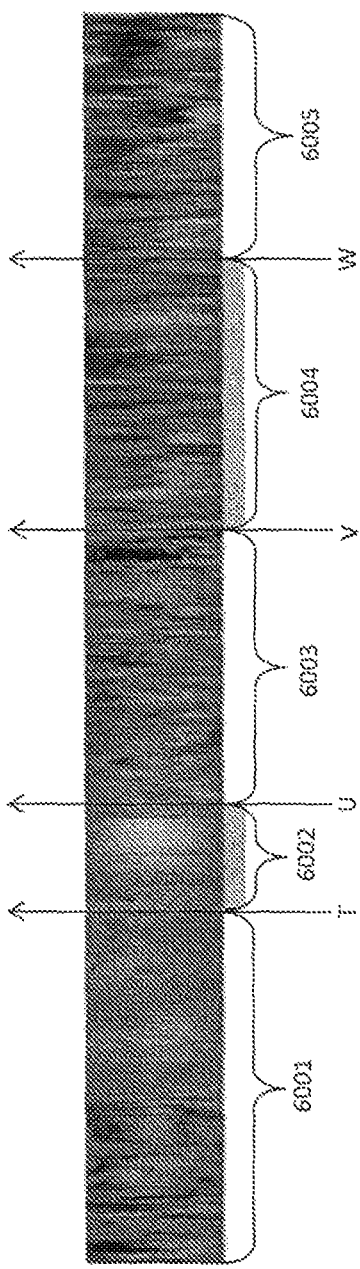

Segments 6002 and 6004 in FIG. 6B indicate a level of intestinal content higher than the preset threshold, while segments 6001, 6003 and 6005 indicate a clean frame sequence. Points T, U, V and W indicate the detected points of change, which were detected using an adaptive windowing algorithm according to embodiments of the invention.

Figure 6C:
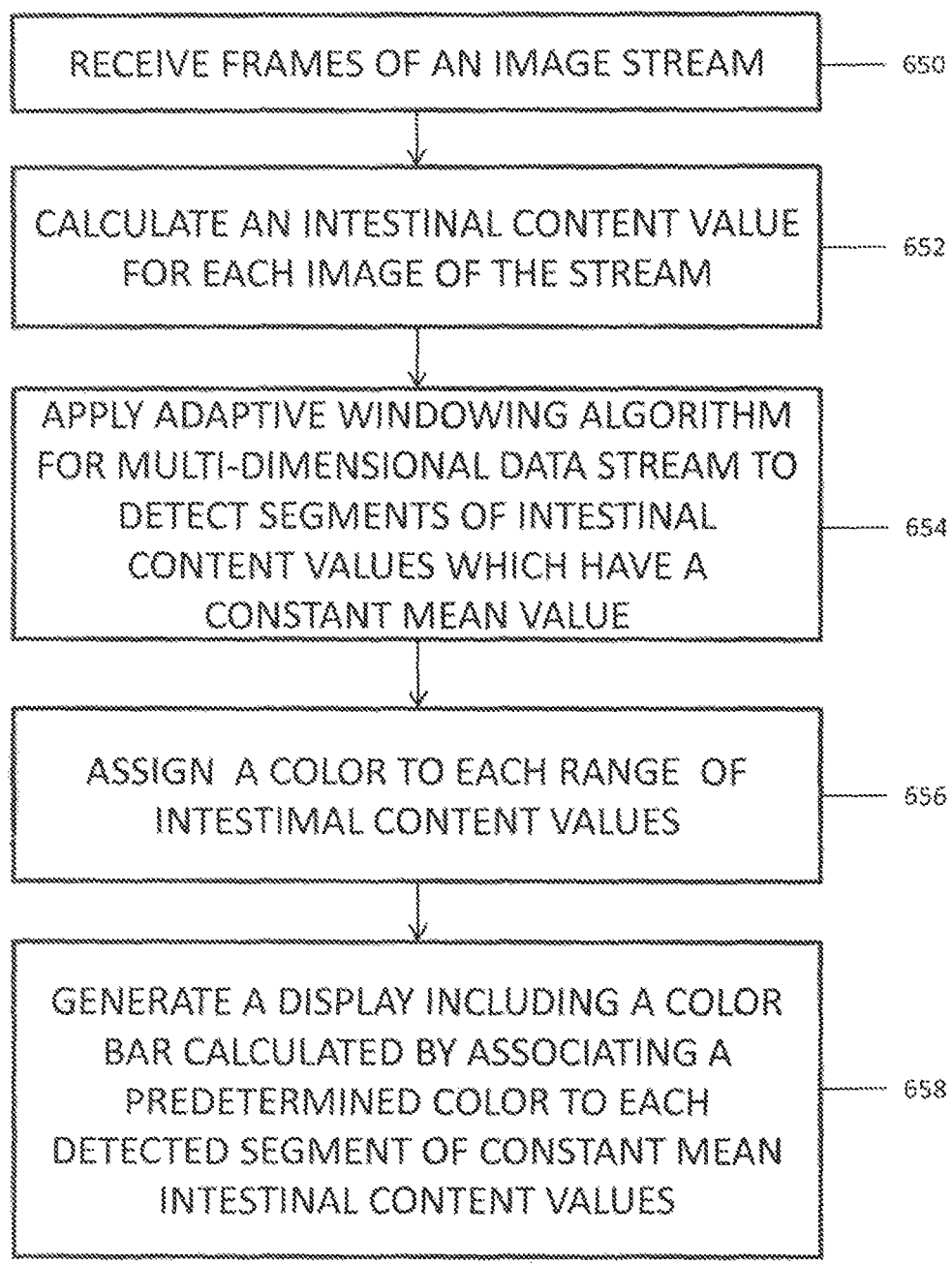
FIG. 6C is a flow chart of a method for segmentation of an image stream based on intestinal content levels, according to a third embodiment of the invention.

Reference is made to FIG. 6C, which is a flow chart of a method for segmentation of an image stream based on intestinal content levels, according to an embodiment of the invention. In operation 650, some or all frames of an image stream may be obtained or received for intestinal content segmentation analysis. In operation 652, an intestinal content value may be calculated for each received frame. The intestinal content value may be calculated based on pixel values of the corresponding received frame. In operation 654, an adaptive windowing algorithm may be applied to the intestinal content values to detect segments of analyzed frames which have a constant mean value of the corresponding intestinal content value of the frames. The segments may be detected, for example, by determining points of change using a window of frames. Possible partition points in the window of analyzed frames may be determined, and a difference measure may be calculated for differences between mean values of the intestinal content values of frames in each sub-window of frames in a possible partition point. The difference measure may be equal to or based on, for example in this embodiment, the absolute value of the calculated difference.

In operations 656 and 658, optionally, a display may be generated to graphically present the calculated frames segmentation according to the intestinal content values. In one example, different colors may be assigned to different levels of depicted content in image frames, and the assigned colors may be displayed in a color bar, for example along a time bar of the analyzed image stream, or along another color bar or another segmentation bar which may be based on other parameters or sets of properties. Each assigned color may indicate a predetermined range or level of intestinal content that was detected in the analyzed image frames. Other methods of presentation or display may be used. In some embodiments, the user may receive other indications of the transition points between segments of the analyzed image stream, e.g. marked on the image frames during playback of the image stream during review, or any other visual indication which may alert to a point of change that was detected in the image stream.

Figure 7:
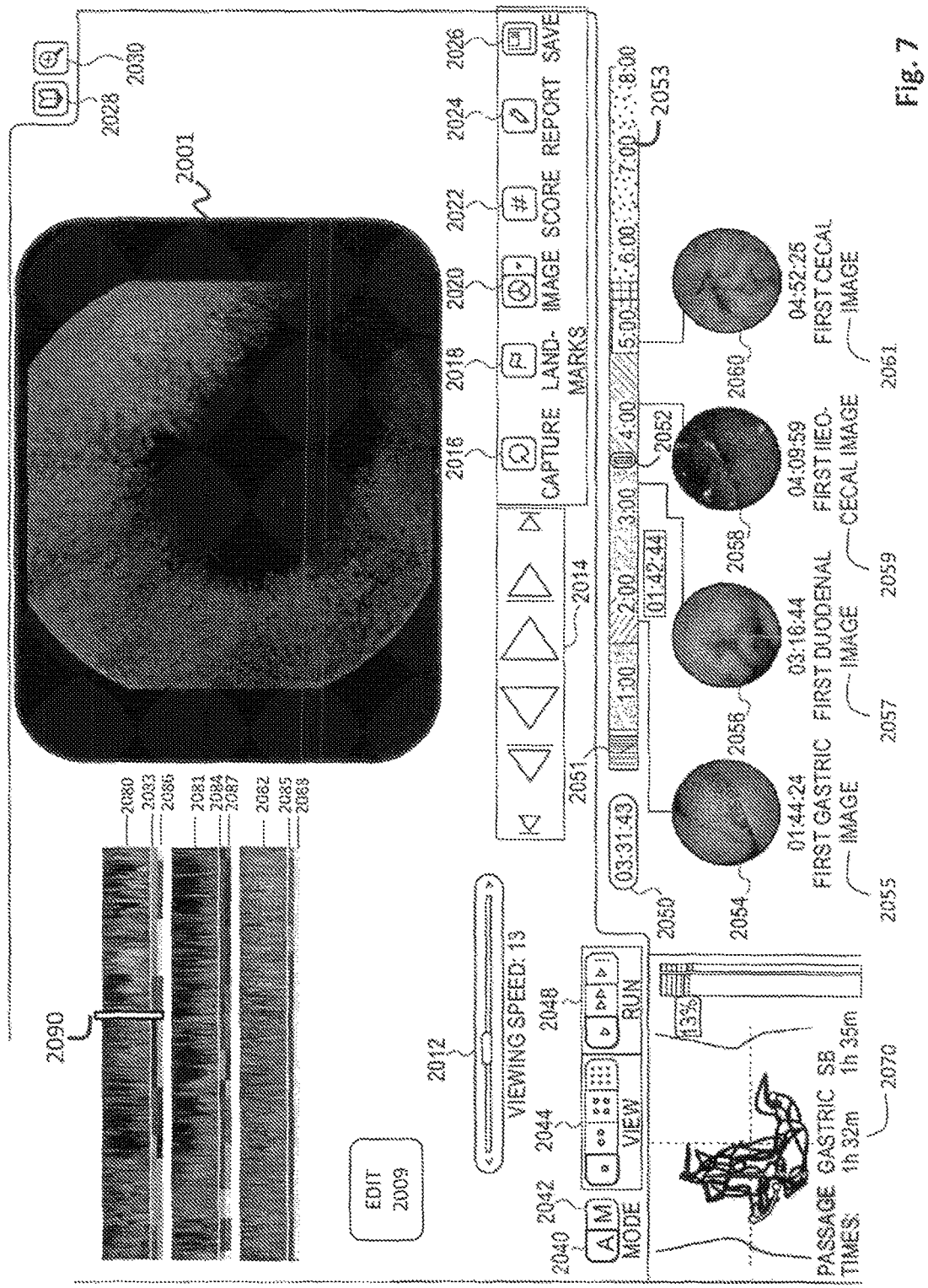
FIG. 7 is a schematic illustration of a Graphic User Interface according to an embodiment of the present invention.

Reference is made to FIG. 7, which is a schematic illustration of an exemplary Graphic User Interface (GUI) for segmentation analysis and display of an in vivo image stream captured by an in vivo device. The GUI may include a set of editing tools which may be displayed on a monitor, such as the monitor 18 of FIG. 1, according to an embodiment of the present invention. One or more image windows 2001 may display images of an image stream, for example a video view of an image stream, which may be a reduced image stream which contains a selected subset of images, or an original (e.g., as captured by the imaging device 40) image stream. In some embodiments, images may be displayed as a set of reduced-size images, e.g. thumbnails or larger images, and not necessarily as an image stream.

Controls 2014 may alter the display of the image stream in one or more image windows 2001. Controls 2014 may include for example stop, play, pause, capture image, step, fast-forward, rewind, or other controls, to freeze, speed up, or reverse the image stream in window 2001. The user may operate controls 2014 using an input device (e.g., input device 22 of FIG. 1 such as a keyboard and/or mouse).

In one embodiment, strips, portions, slices or cuts of images from an image stream, which may be associated with specific criteria, may be summarized or represented in a visual representation of motility events which may be detected in an image stream, for example as shown in motility events bars or displays 2080, 2083 and 2086, and may be displayed to the user. The combined strips or cuts may provide an indication of motility events that occurred during the imaging procedure, and the generation of one or more motility bars or other presentations may simplify or assist analysis of motility events which occurred during an imaging procedure of the patient's GI tract.

A cursor 2090 may be positioned on at least one of the motility events bars 2080, 2081 and 2082, and may indicate to the viewer the correlation between the motility events bar and the image currently being displayed in image window 2001. For example, the strip of pixels obtained from the image frame displayed in window 2001 may be indicated by the cursor 2090. In some embodiments, the time of capture of the image frame may be indicated by the cursor 2090, and the motility events bar may be positioned, for example, alongside the time and tissue color bar 2051. According to some embodiments, the motility events bars 2080-2082 may be displayed separately, e.g. in a different screen, not alongside image stream window 2001, or upon user request.

Alongside motility events bars 2080-2082, and/or alongside timebar 2053, and/or alongside tissue color bar 2051, segmentation bars 2083-2088 may be displayed. The segmentation bars may be calculated according to different sets of properties—for example, segmentation bars 2083-2085 may be calculated based on contractions density property, e.g. as described with relation to FIGS. 5A-5C herein. Segmentation bars 2086-2088 may be calculated based on a lumen size property, also described with relation to FIGS. 5A-5C herein. Segmentation bars which are calculated based on other properties may be displayed instead or in addition. In some embodiments, points of change or transition which were identified, for example, based on the segmentation analysis described above, may be visually marked on the GUI display. The segmentation bars 2083-2088 are one example of a summarized representation of the image stream which includes a plurality of segments, each segment corresponding to a segment of constant mean values in the sets of pixel-based properties An edit/create control 2009 may be provided to allow user selection of criteria for generation of motility events bars 2080-2082, or for segmentation bars for example, from a list of a plurality of available criteria for selection (e.g., by clicking a tab, check-box, or marker indicating specific criteria). For example, a user may select segments of the GI tract which will be used for producing the motility events bar, or may select different types of motility event bar generation criteria (e.g. maximizing the lumen hole in the generated bar, and/or maximizing other predefined features). The selection of the pixel strip may also be influenced by user input, e.g. by enabling selection of parameters which determine the generated motility events bar, e.g. selecting a fixed cut view and/or adaptive cut views.

In some embodiments, more than one image stream may be displayed concurrently on the monitor, for example as disclosed in FIGS. 9A, 9B and 10A, 10B of U.S. Pat. No. 7,474,327 to Davidson et al., assigned to the common assignee of the present application and incorporated herein by reference in its entirety. For example, if the imaging device includes more than one imaging system, one or more image streams obtained by an imaging system may be used to generate the motility display. For example, data used in a motility events bar may be summarized from one or more image streams of a single imaging procedure.

Timeline or time bar 2053 may provide a timeline or time chart of the image stream, for example by displaying a line indicating the capture time of images, starting from the beginning of the imaging procedure. A cursor 2052 may be positioned over time bar 2053 and may indicate capture time of an image being displayed, for example, currently in window 2001.

A tissue color bar 2051 may be generated, for example, according to embodiments described in US Published Application No. 2010-0053313, incorporated herein by reference in its entirety. Tissue color bar 2051 may overlap with time bar 2053, or may be presented separately. In some embodiments, tissue color bar 2051 may be formed of a number of strips or elements aligned adjacent to each other, or assembled in a continuing bar. Each strip or element in tissue color bar 2051 may represent summarized information, for example, a mean or average color value or intensity, of image frames captured during a predetermined time duration (e.g., a one-minute period). In some embodiments, each strip in the tissue color bar 2051 may correspond to one image frame, e.g. may summarize an average color, intensity, pH level, etc. of a displayed image frame.

Thumbnail images 2054, 2056, 2058 and 2060 may be displayed with reference to an appropriate relative time on the time chart 2053. Related annotations or summaries 2055, 2057, 2059 and 2061 may include the image capture time of the image corresponding to each thumbnail image, and summary information associated with the respective thumbnail image. Time indicator 2050 may provide a representation of the absolute time elapsed for or associated with the current image being shown in image windows 2001, the total length of the edited image stream and/or the original unedited image stream. Absolute time elapsed for the current image being shown may be, for example, the amount of time that elapsed between the moment the imaging device (e.g., capsule 40 of FIG. 1) was first activated or an image receiver (e.g., image receiver 12 of FIG. 1) started receiving transmission from the imaging device and the moment that the current image being displayed was captured or received, or from passage of the in-vivo device of a certain physiological landmark, such as the passage from the stomach to the small intestine. One or more monitors or image windows 2001 may be used to display the image stream and other data.

Different options for displaying motility information to a user are available according to embodiments of the present invention. In one example, motility events bars 2080-2082 and/or segmentation bars 2083-2088 may be displayed as a bar at a predetermined location on the display screen, for example aligned with (or alongside) tissue color bar 2051, and/or aligned with (or alongside) time bar 2053. A single cursor indicating the current image being displayed (e.g., indicating the time of capturing the image, and the corresponding pixel strip in the motility events bar) may be used.

In another example, image stream segmentation information may be displayed in a separate window or screen, e.g. not alongside the image stream window. The segmentation bars 2083-2088 may be displayed upon user demand, for example in a pop-up window which may be presented.

Capsule position window 2070 may include a current position and/or orientation of the imaging device in the gastrointestinal tract of the patient, and may display different segments of the GI tract using different colors. The capsule position may be an approximated or estimated position of the capsule inside the GI tract. A highlighted segment may indicate the position of the imaging device when the currently displayed image (or plurality of images) was captured. A bar or chart in window 2070 may indicate the total path length traveled by the imaging device, and may provide an estimation or calculation of the percentage of the path traveled at the time the presently displayed image was captured.

Buttons 2040 and 2042 may allow the viewer to select between a manual viewing mode, for example an unedited image stream, and an automatically edited viewing mode, in which the user may view only a subset of images from the stream edited according to predetermined criteria. View buttons 2044 allow the viewer to select between viewing the image stream in a single window, or viewing multiple image streams in double, quadruple, or mosaic view mode. The display buttons 2048 may display to the viewer images from the original stream, or only selected images with suspected bleeding indications.

Viewing speed bar 2012 may be adjusted by the user. For example the slider may indicate the number of displayed frames per second. Buttons 2016, 2018, 2020, 2022, 2024, and 2026 may allow a user to capture landmark images or thumbnail images, input a manual score or comment for an image, generate a report for the viewed image stream, and save the clinical findings and markings of the viewer. Control 2028 may allow a user to access a dictionary or atlas of sample images, e.g. of pathologies or anatomical landmarks in the GI tract. Control 2030 may allow resizing the image on display in window 2001 (e.g. zooming in or zooming out).

Different embodiments are disclosed herein. Features of certain embodiments may be combined with features of other embodiments; thus certain embodiments may be combinations of features of multiple embodiments.

Embodiments of the invention may include an article such as a computer or processor readable non-transitory storage medium, such as for example a memory, a disk drive, or a USB flash memory encoding, including or storing instructions, e.g., computer-executable instructions, which when executed by a processor or controller, cause the processor or controller to carry out methods disclosed herein. In some embodiments, a processing unit, computer processor or computer controller, e.g., data processor 14 (and/or modules such as segment display generator 24), may be configured to carry out embodiments of the invention, for example by executing software or code stored in a memory connected to the processor, and/or by having dedicated circuitry. Modules such as segment display generator 24 may be code or software executed by processor 14.

The foregoing description of the embodiments of the invention has been presented for the purposes of illustration and description. It is not intended to be exhaustive or to limit the invention to the precise form disclosed. It should be appreciated by persons skilled in the art that many modifications, variations, substitutions, changes, and equivalents are possible in light of the above teaching. It is, therefore, to be understood that the appended claims are intended to cover all such modifications and changes as fall within the true spirit of the invention.

The invention claimed is:

1. A computer-implemented method for partitioning an image stream into a plurality of segments, the method comprising:
    receiving an image stream captured by an in vivo device, the image stream comprising image frames, each frame comprising a plurality of pixels;
    calculating a set of pixel-based properties for each frame of at least a selected subset of frames from the image stream; and
    detecting segments of constant mean values in the sets of pixel-based properties, by:
    selecting windows of sequential frames in the image stream, and for each window;
    determining possible partition points for the window, each partition point splitting the window of sequential frames into two corresponding sub-windows of sequential frames,
    calculating, for each of the possible partition points of the window, a difference between mean values of the sets of pixel-based properties of the corresponding sub-windows of frames, and
    identifying points of change in the calculated differences between the mean values of the sets of pixel-based properties;
    wherein the detection of segments of constant mean values is based on the points of change; and
    displaying a summarized representation of the image stream on a visual display unit, wherein the summarized representation includes a plurality of segments, each segment corresponding to a segment of the segments of constant mean values in the sets of pixel-based properties.

2. The method of claim 1 wherein displaying a summarized representation of the image stream comprises assigning a color value to each of the detected segments, and displaying the assigned colors sequentially in a color bar.

3. The method of claim 1, wherein identifying points of change in the calculated differences between the mean values comprises:
    selecting a value p for computing a p-norm value for each difference of the differences; and
    calculating the p-norm value of said each difference.

4. The method of claim 1, wherein identifying points of change in the calculated difference between the mean values further comprises comparing the calculated difference to a segmentation threshold.

5. The method of claim 4, wherein the segmentation threshold is calculated based on a confidence value δ, a value p for computing a p-norm value, and the size of the window of frames.

6. The method of claim 1, comprising determining a confidence value δ, wherein confidence value δ is correlated to the probability that a point of change is incorrectly identified in the calculated differences between the mean values of the sets of pixel-based properties.

7. The method of claim 1, wherein at least one property in the set of pixel-based properties indicates a level of intestinal content depicted in the image frame, and wherein a predetermined value in the summarized representation of the image stream indicates a segment of the image stream which includes image frames with an above threshold level of intestinal content.

8. The method of claim 2, wherein at least a subset of properties in the set of pixel-based properties indicates a mean color of the image frame, and wherein colors in the color bar are assigned based on the mean color of the corresponding detected segment.

9. The method of claim 1, wherein the set of pixel-based properties indicates a diameter of an intestinal lumen hole detected in the image frame, and wherein segments of the image stream which include image frames with an intestinal lumen diameter within a predetermined range are mapped to predetermined colors in a color bar.

10. The method of claim 1, wherein the set of pixel-based properties indicates a contraction density detected in the image frame, and wherein segments of the image stream which include image frames with a contraction density within a predetermined range are mapped to predetermined colors in a color bar.

11. The method of claim 1, comprising calculating difference measures which correlate to the differences between the mean values, and identifying points of change in the difference measures.

12. A computer-implemented method for segmenting an image stream to a plurality of segments, the method comprising:
    receiving an image stream captured by an in vivo device, the image stream comprising image frames, each frame comprising a plurality of pixels;
    based on the frame pixels, calculating a feature vector for each frame of at least a selected subset of frames from the image stream;
    determining possible splits of at least a portion of the image stream into two sequential series of frames;
    calculating mean values for the feature vectors of each sequential series of frames of a possible split of the image stream;
    calculating difference measures based on differences between the mean values of the feature vectors of each sequential series of frames of a possible split of the image stream to identify points of change in the mean values; and
    segmenting the image stream according to the identified points of change.

13. The method of claim 12 comprising displaying a summarized representation of the image stream on an image monitor, wherein the summarized representation includes a plurality of segments corresponding to the segmenting.

14. The method of claim 13, wherein displaying a summarized representation comprises assigning a color value to segments and displaying the assigned colors sequentially in a color bar.

15. The method of claim 12, wherein the feature vectors comprise pixel-based properties.

16. A system for segmenting an image stream to a plurality of segments, the system comprising:
- a memory; and
- a computer processor configured to:
  - receive image frames captured by an in vivo imaging device, each frame comprising a plurality of pixels;
  - calculate a set of pixel-based properties for each frame of at least a selected subset of frames from the image stream;
  - detect segments of constant mean values in the sets of pixel-based properties, by:
  - selecting windows of sequential frames in the received image frames, and for each window;
  - determining possible partition points for the window, each partition point splitting the window of sequential frames into two corresponding sub-windows of sequential frames,
  - calculating, for each of the possible partition points of the window, a difference between mean values of the sets of pixel-based properties of the corresponding sub-windows of frames, and
  - identifying points of change in the calculated differences between the mean values of the sets of pixel-based properties;
  - wherein the detection of segments of constant mean values is based on the points of change; and
- a display unit to display a summarized representation of the image stream, wherein the summarized representation includes a plurality of segments, each segment corresponding to a segment of the segments of constant mean values in the sets of pixel-based properties.

17. The system of claim 16, wherein identifying points of change in the calculated differences between the mean values further comprises comparing the calculated differences to a segmentation threshold.

18. The system of claim 16, wherein the computer processor is further configured to determine a confidence value $\delta$, wherein confidence value $\delta$ is correlated to the probability that a point of change is incorrectly identified.

19. The system of claim 16, wherein displaying a summarized representation of the image stream comprises assigning a color value to each of the detected segments, and displaying the assigned colors sequentially in a color bar.

20. The system of claim 16, wherein identifying points of change in the calculated differences between the mean values comprises:
- selecting a value p for computing a p-norm value for each difference of the differences; and
- calculating the p-norm value of said each difference.

* * * * *